US011526476B2

(12) United States Patent
Zhang et al.

(10) Patent No.: US 11,526,476 B2
(45) Date of Patent: Dec. 13, 2022

(54) FILE SYSTEM PERMISSION SETTING METHOD AND APPARATUS

(71) Applicant: Huawei Technologies Co., Ltd., Shenzhen (CN)

(72) Inventors: Junwei Zhang, Shenzhen (CN); Xiaoqin Xie, Beijing (CN); Yongjian Li, Beijing (CN); Yong Peng, Beijing (CN); Mantang Ma, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 560 days.

(21) Appl. No.: 16/717,294

(22) Filed: Dec. 17, 2019

(65) Prior Publication Data

US 2020/0125543 A1 Apr. 23, 2020

Related U.S. Application Data

(63) Continuation of application No. PCT/CN2018/076741, filed on Feb. 13, 2018.

(30) Foreign Application Priority Data

Jun. 30, 2017 (CN) .......................... 201710526006.6

(51) Int. Cl.
G06F 16/21 (2019.01)
G06F 16/2457 (2019.01)
G06F 16/22 (2019.01)
G06F 21/62 (2013.01)

(52) U.S. Cl.
CPC .......... *G06F 16/214* (2019.01); *G06F 16/219* (2019.01); *G06F 16/2246* (2019.01); *G06F 16/24573* (2019.01); *G06F 21/6218* (2013.01); *G06F 2221/2141* (2013.01)

(58) Field of Classification Search
CPC .......... G06F 16/2246; G06F 16/24573; G06F 16/219

See application file for complete search history.

(56) References Cited

U.S. PATENT DOCUMENTS 7,145,898 B1 * 12/2006 Elliott ................... H04L 67/306
379/900
7,421,433 B2 * 9/2008 Xu .......................... G06F 16/30
(Continued)

FOREIGN PATENT DOCUMENTS

CN 101384985 A 3/2009
CN 101674334 A 3/2010
(Continued)

OTHER PUBLICATIONS

Machine Translation and Abstract of Chinese Publication No. CN101674334, Mar. 17, 2010, 18 pages.
(Continued)

*Primary Examiner* — Eliyah S. Harper
(74) *Attorney, Agent, or Firm* — Conley Rose, P.C.

(57) ABSTRACT

A file system permission setting method and apparatus, where an access control list (ACL) permission for a parent node is set such that all child nodes of the parent node inherit the ACL permission for the parent node when a semantic type identifier of an access permission for the parent node is a permission root type.

20 Claims, 5 Drawing Sheets

(56) References Cited

U.S. PATENT DOCUMENTS

| | | | |
|---|---|---|---|
| 7,809,776 B1* | 10/2010 | Witte | G06F 16/1734 |
| | | | 707/825 |
| 2007/0067256 A1* | 3/2007 | Zayas | G06F 16/10 |
| 2007/0083482 A1* | 4/2007 | Rathi | G06F 3/048 |
| 2008/0120687 A1 | 5/2008 | Johnson | |
| 2010/0082865 A1* | 4/2010 | Kirshenbaum | G06F 21/6218 |
| | | | 710/113 |
| 2011/0320400 A1* | 12/2011 | Namini | G06F 16/27 |
| | | | 707/610 |
| 2012/0278289 A1 | 11/2012 | Urano et al. | |
| 2013/0061252 A1* | 3/2013 | Bernbo | G06F 16/285 |
| | | | 707/E17.005 |
| 2016/0321287 A1* | 11/2016 | Luthra | H04L 67/06 |
| 2017/0060667 A1* | 3/2017 | Chandraiah setty Narasingarayanapeta et al. | G06F 16/219 |
| 2018/0189369 A1* | 7/2018 | Baek | G06F 16/219 |

FOREIGN PATENT DOCUMENTS

| | | |
|---|---|---|
| CN | 102129539 A | 7/2011 |
| CN | 103064957 A | 4/2013 |
| CN | 103067400 A | 4/2013 |
| CN | 104145468 A | 11/2014 |
| CN | 106682186 A | 5/2017 |
| CN | 107403105 A | 11/2017 |
| EP | 2634722 A1 | 9/2013 |

OTHER PUBLICATIONS

Machine Translation and Abstract of Chinese Publication No. CN102129539, Jul. 20, 2011, 10 pages.

Machine Translation and Abstract of Chinese Publication No. CN103064957, Apr. 24, 2013, 24 pages.

Machine Translation and Abstract of Chinese Publication No. CN103067400, Apr. 24, 2013, 18 pages.

Machine Translation and Abstract of Chinese Publication No. CN104145468, Nov. 12, 2014, 26 pages.

Machine Translation and Abstract of Chinese Publication No. CN106682186, May 17, 2017, 48 pages.

Machine Translation and Abstract of Chinese Publication No. CN107403105, Nov. 28, 2017, 53 pages.

Liang, R., et al., "Linux basics and application tutorial (based on CentOS7 2nd Edition)," Jul. 31, 2016, 3 pages.

* cited by examiner

FILE SYSTEM PERMISSION SETTING METHOD AND APPARATUS

CROSS-REFERENCE TO RELATED APPLICATION

This application is a continuation of International Patent Application No. PCT/CN2018/076741 filed on Feb. 13, 2018, which claims priority to Chinese Patent Application No. 201710526006.6 filed on Jun. 30, 2017. The disclosures of the aforementioned applications are hereby incorporated by reference in their entireties.

TECHNICAL FIELD

Embodiments of the present disclosure relate to the file system field, and in particular, to a file system permission setting method and apparatus.

BACKGROUND

A file system is a structured data storage and organization form. A file system can be used only after being mounted. An organizational structure of the file system is represented as a tree-like directory tree. The directory tree includes a root directory, a subdirectory, and a file below the subdirectory. The subdirectory may include not only a file but also a lower-level subdirectory. By analogy, a directory tree of a multi-level directory structure is formed. A root of the tree-like structure is a mount point. In the directory tree, the root directory is located on a root node of the directory tree, the file is located on a leaf node of the directory tree, and the subdirectory is located on an intermediate node of the directory tree. Each of the file and the directory is a to-be-accessed object. Before a node that a terminal device or an application program needs to access is accessed, access control list (ACL) permission for the to-be-accessed node is queried, and data of the to-be-accessed node is accessed after access permission for the node is obtained. To control access permission of different access devices for different nodes, one ACL is configured for each node in order to separately configure access permission for each node. Further, an ACL of each node includes several access control entries (ACEs). The ACE is used to record an access permission type of the node, and is used to record content such as an access device that accesses the node, and access permission of the access device for the node.

An existing portable operating system interface (POSIX) standard semantics defines an access permission setting standard of a node of a directory tree. According to a stipulation of the POSIX standard semantics, ACL permission setting of a node in a directory tree does not affect ACL permission for all subdirectories and files included in a directory corresponding to the node. When a location of a node in the directory tree is changed, ACL permission for the node is not changed, and when a location, in the directory tree, of a node to which a directory belongs is changed, ACL permission for all subdirectories and files below the directory is not changed. Implementing the POSIX standard semantics, ACL permission is separately set for a node following the POSIX standard semantics. In addition, for a plurality of nodes that have the same ACL permission, ACL permission is separately set for each node. In this way, ACL setting of the node in the directory tree traverses all nodes in the directory tree and separately sets an ACL for each node in the directory tree, causing relatively low efficiency of setting access permission for the node.

SUMMARY

The present disclosure discloses a file system permission setting method and apparatus, where in the file system permission setting method, a POSIX standard semantics is supported while ACL setting overheads and storage overheads of a node are reduced.

According to a first aspect, a file system permission setting method is provided, where the method is applied to a storage system and includes receiving a permission setting request, where the permission setting request is used to request to set access permission for a node in a directory tree of a file system, the permission setting request includes an identifier, a semantic type identifier, and a permission record of a node to be set with permission, and the semantic type includes a permission root type and a private type. After receiving the permission setting request, the storage system obtains a currently recorded global version parameter, and allocates, based on the currently recorded global version parameter, a permission version number to the node to be set with permission. Then, the storage system stores the identifier, the semantic type identifier, the permission version number, and the permission record of the node to be set with permission. When the semantic type is the permission root type, the permission version number of the node to be set with permission is a latest global version parameter obtained after the currently recorded global version parameter is updated. When the semantic type is the private type, the permission version number of the node to be set with permission is the currently recorded global version parameter or the latest global version parameter obtained after the currently recorded global version parameter is updated. Global version parameters are set incrementally or decrementally, and each global version number represents one permission setting operation on any node of the directory tree. When the semantic type is the permission root type, a permission record of a child node of the node to be set with permission inherits a permission record obtained after a current permission setting operation on the node to be set with permission.

According to a method for quickly setting ACL permission for a directory tree in the present disclosure, when a semantic type parameter indicates that a semantic type followed by access permission for a parent node is a permission root type, all files and all subdirectories below a directory corresponding to the parent node inherit ACL permission for the parent node. Therefore, only the ACL permission for the parent node needs to be set. It is unnecessary to traverse all the subdirectories or files below the parent node to separately set ACL permission for each subdirectory or file below the parent node, thereby improving efficiency of setting ACL permission for the directory tree. In this case, the ACL permission is set for the parent node, and the ACL permission does not need to be repeatedly set for the subdirectories and the files below the directory corresponding to the parent node, thereby reducing storage space overheads. When the semantic type parameter indicates that the semantic type followed by the access permission for the parent node is the private type, the access permission for the parent node does not affect ACL permission for all child nodes of the parent node after permission setting is currently performed on the parent node. In this case, a manner of setting ACL permission for a node that follows a POSIX standard semantics may be implemented.

Based on the first aspect, in a first implementation, obtaining a currently recorded global version parameter includes querying a global ACL to obtain the currently recorded global version parameter, where the global ACL is stored in metadata of a root node of the directory tree, and the global ACL stores the global version parameter.

Based on the first implementation of the first aspect, in a second implementation, before receiving a permission setting request, the method further includes creating the global ACL, and setting an initial global version parameter for the newly created global ACL.

Based on the first or second implementation of the first aspect, in a third implementation, the permission setting request further includes path information of the node to be set with permission, the path information of the node to be set with permission indicates all nodes on an access branch from the root node to the node to be set with permission, and the method further includes storing the path information of the node to be set with permission into the global ACL, where the identifier, the semantic type identifier, the permission version number, the path information, and the permission record of the node to be set with permission form one correspondence. Because the identifier, the path information, and the permission record of the node to be set with permission form a correspondence, and the correspondence is stored in the global ACL, the identifier, the semantic type, the permission version number, the path information, and the permission record of the node to be set with permission in the directory tree can be obtained by simply indexing the global ACL. This provides a simple access channel for obtaining a permission version number, a semantic type, a permission record, and path information of a node in the directory tree.

Based on any one of the first aspect, or the first to the third implementations of the first aspect, in a fourth implementation, storing the identifier, the semantic type identifier, the permission version number, and the permission record of the node to be set with permission includes storing the identifier, the semantic type identifier, the permission version number, and the permission record of the node to be set with permission into metadata of the node to be set with permission, where the metadata of the node to be set with permission further includes path information of the node to be set with permission, the path information of the node to be set with permission indicates all nodes on an access branch from the root node to the node to be set with permission, and the identifier, the semantic type identifier, the path information, the permission version number, and the permission record of the node to be set with permission form one correspondence.

Based on any one of the first aspect, or the first to the fourth implementations of the first aspect, in a fifth implementation, the method further includes receiving a first access request for accessing data, obtaining access permission for a first to-be-accessed node based on an identifier of the first to-be-accessed node, and performing authentication based on the access permission for the first to-be-accessed node, and accessing data of the first to-be-accessed node after the authentication succeeds. The first access request for accessing data includes the identifier of the first to-be-accessed node. When a permission version number of the first to-be-accessed node is the latest in permission version numbers of the first to-be-accessed node and all parent nodes of the first to-be-accessed node and that have the permission root type, the access permission for the first to-be-accessed node is a recorded permission record of the first to-be-accessed node. When the permission version number of the first to-be-accessed node is not the latest in the permission version numbers of the first to-be-accessed node and all the parent nodes of the first to-be-accessed node and that have the permission root type, the access permission for the first to-be-accessed node inherits a permission record corresponding to a parent node of the first to-be-accessed node and that has a latest permission version number.

Based on the fifth implementation of the first aspect, in a sixth implementation, obtaining access permission for a first to-be-accessed node based on an identifier of the first to-be-accessed node includes determining path information of the first to-be-accessed node based on the identifier of the first to-be-accessed node, and querying permission version numbers of the first to-be-accessed node and all parent nodes of the first to-be-accessed node and that have the permission root type, to determine a node with a latest permission version number and obtain a permission record of the node with the latest permission version number, where the first to-be-accessed node and all the parent nodes are indicated by the path information of the first to-be-accessed node. The path information of the first to-be-accessed node is used to indicate the first to-be-accessed node and all the parent nodes of the first to-be-accessed node, and the permission record of the node with the latest permission version number is the access permission for the first to-be-accessed node.

Based on the sixth implementation of the first aspect, in a seventh implementation, querying permission version numbers of the first to-be-accessed node and all parent nodes of the first to-be-accessed node and that have the permission root type to determine a node with a latest permission version number, where the first to-be-accessed node and all the parent nodes are indicated by the path information of the first to-be-accessed node includes comparing, according to a preset traversal rule, the permission version numbers of the first to-be-accessed node and all the parent nodes of the first to-be-accessed node and that have the permission root type to determine the node with the latest permission version number, where the first to-be-accessed node and all the parent nodes are indicated by the path information of the first to-be-accessed node. Comparing, according to a preset traversal rule, the permission version numbers of the first to-be-accessed node and all the parent nodes of the first to-be-accessed node and that have the permission root type to determine the node with the latest permission version number, where the first to-be-accessed node and all the parent nodes are indicated by the path information of the first to-be-accessed node may be presetting the traversal rule based on a distribution rule of access permission for nodes in the directory tree and comparing, using a proper preset traversal rule, the permission version numbers of the first to-be-accessed node and all the parent nodes of the first to-be-accessed node and that have the permission root type to determine the node with the latest permission version number, thereby improving traversal comparison efficiency.

Based on the seventh implementation of the first aspect, in an eighth implementation, all nodes indicated by path information of each node in the directory tree separately belong to different directory levels. A directory level of a parent node in all the nodes indicated by the path information of each node in the directory tree is higher than a directory level of a child node that belongs to the parent node. A directory level of the first to-be-accessed node is the lowest, and a directory level of the root node is the highest. Comparing, according to a preset traversal rule, the permission version numbers of all the nodes indicated by the path information of the first to-be-accessed node to determine the node with the latest permission version number includes selecting and comparing, starting from the root node, permission version numbers of two nodes each time of all the nodes indicated by the path information of the first to-be-accessed node to determine a node with a newer permission version number, and determining, until the first to-be-accessed node is compared through traversal in descending order of the directory levels, that a node with a newer permission version number is the node with the latest permission version number.

Based on the seventh implementation of the first aspect, in a ninth implementation, all nodes indicated by path information of each node in the directory tree separately belong to different directory levels. A directory level of a parent node in all the nodes indicated by the path information of each node in the directory tree is higher than a directory level of a child node that belongs to the parent node. A directory level of the first to-be-accessed node is the lowest, and a directory level of the root node is the highest. Comparing, according to a preset traversal rule, the permission version numbers of all the nodes indicated by the path information of the first to-be-accessed node to determine the node with the latest permission version number includes selecting and comparing, starting from the first to-be-accessed node, permission version numbers of two nodes each time of all the nodes indicated by the path information of the first to-be-accessed node to determine a node with a newer permission version number, and determining, until the root node is compared through traversal in ascending order of the directory levels, that a node with a newer permission version number is the node with the latest permission version number.

Based on any one of the first to the ninth implementations of the first aspect, in a tenth implementation, the method further includes receiving a node moving request, determining a second node, storing a permission version number and a permission record of the second node, and moving the to-be-moved node to become a child node of a target node, where the node moving request includes an identifier of the to-be-moved node and an identifier of the target node. The target node is an upper-level parent node of the to-be-moved node after the to-be-moved node is moved, the second node is a node that has latest permission in all parent nodes indicated by path information of the to-be-moved node after the to-be-moved node is moved, and the second node is a node that has the permission root type.

Based on the tenth implementation of the first aspect, in an eleventh implementation, after moving the to-be-moved node to become a child node of a target node, the method further includes receiving a second access request for accessing data, determining whether a permission version of the second node is the latest in permission versions of all nodes indicated by information about a path from a second to-be-accessed node to the root node after moving, where if the permission version of the second node is the latest in the permission versions of all the nodes indicated by the information about the path from the second to-be-accessed node to the root node after moving, access permission for the second to-be-accessed node inherits a permission record of a node that has latest permission in all nodes indicated by a path from the second to-be-accessed node to the root node before moving.

Based on the eleventh implementation of the first aspect, in a twelfth implementation, if the permission version of the second node is not the latest in the permission versions of all the nodes indicated by the information about the path from the second to-be-accessed node to the root node after moving, the access permission for the second to-be-accessed node inherits permission for a node that has a latest permission version in all the nodes indicated by the information about the path from the second to-be-accessed node to the root node after moving.

In the present disclosure, if a node in the directory tree needs to be moved, before the to-be-moved node is moved, nodes having latest permission in all nodes indicated by path information of the to-be-moved node before and after the to-be-moved node is moved are separately determined. After the to-be-moved node is moved, when the to-be-moved node or any child node of the to-be-moved node is being accessed, if a permission record is set for any node in all nodes indicated by path information of the to-be-accessed node after the to-be-moved node is moved, access permission for the to-be-accessed node inherits access permission for the to-be-accessed node after moving, and the access permission for the to-be-accessed node after moving inherits access permission for a node that has latest permission in the to-be-accessed node and all parent nodes of the permission root type after moving. If no permission record is set for all the nodes indicated by the path information of the to-be-accessed node after the to-be-moved node is moved, the access permission for the to-be-accessed node is access permission for the to-be-accessed node before moving, and the access permission for the to-be-accessed node before moving inherits access permission for a node that has latest permission in the to-be-accessed node and all parent nodes having the permission root type before moving. After the to-be-moved node is moved, no permission record is set for all the nodes indicated by the path information of the to-be-accessed node, and the access permission for the to-be-accessed node is the access permission for the to-be-accessed node before moving, which complies with a stipulation defined in the POSIX semantics that moving a node does not change access permission for the moved node and any child node below the moved node.

Based on any one of the first to the twelfth implementations of the first aspect, in a thirteenth implementation, the method further includes receiving a node creation request, and setting an initial permission version number for the newly added node. The node creation request includes an identifier and path information of a newly added node of the directory tree, and the path information of the newly added node indicates all nodes on an access branch from the root node to the newly added node. When access permission for an upper-level parent node of the newly added node is of the permission root type, the initial permission version number that is set for the newly added node is less than or equal to the initial global version parameter, and when the access permission for the upper-level parent node of the newly added node is of the private type, a permission record of the newly added node inherits a permission record of the upper-level parent node of the newly added node, and the initial permission version number that is set for the newly added node is a permission version number of the upper-level parent node of the newly added node. In the method for setting permission for a newly added node, when the access permission for the upper-level parent node of the newly added node is of the private type to meet the POSIX semantics, the permission record of the newly added node inherits the permission record of the upper-level parent node of the newly added node, and the initial permission version number that is set for the newly added node is the permission version number of the upper-level parent node of the newly added node. Therefore, in the present disclosure, the stipulation of the POSIX standard semantics is supported while efficiency of setting access permission for the newly added node can be improved, and storage overheads of the access permission for the newly added node are reduced.

According to a second aspect, a file system permission setting apparatus is provided, including modules configured to perform the file system permission setting method according to any one of the first aspect or the possible implementations of the first aspect. The modules may be implemented by hardware, or may be implemented by executing corresponding software by hardware. The hardware or the software includes one or more modules corresponding to the functions.

According to a third aspect, a file system permission setting apparatus is provided, including a processor and an interface. The interface is configured to receive a request message. The processor is configured to perform the method according to any one of the first aspect or the possible implementations of the first aspect.

The embodiments of the present disclosure provide the file system permission setting method and apparatus. When a semantic type of access permission for a parent node is a permission root type, all child nodes of the parent node inherit ACL permission for the parent node, and therefore, only the ACL permission for the parent node needs to be set. It is unnecessary to traverse all subdirectories or files below the parent node to separately set ACL permission for each subdirectory or file below the parent node, thereby improving efficiency of setting ACL permission for the directory tree. In addition, only the ACL permission for the parent node needs to be set, and the ACL permission does not need to be repeatedly set for a subdirectory and a file below a directory corresponding to the parent node, thereby reducing storage space overheads. When the semantic type parameter indicates that the semantic type followed by the access permission for the parent node is the private type, the access permission for the parent node does not affect ACL permission for all the child nodes after permission setting is currently performed on the parent node. In this case, a manner of setting ACL permission for a node that follows a POSIX standard semantics may be implemented.

DESCRIPTION OF EMBODIMENTS

The following describes technical solutions in embodiments of the present disclosure with reference to accompanying drawings.

Figure 1:
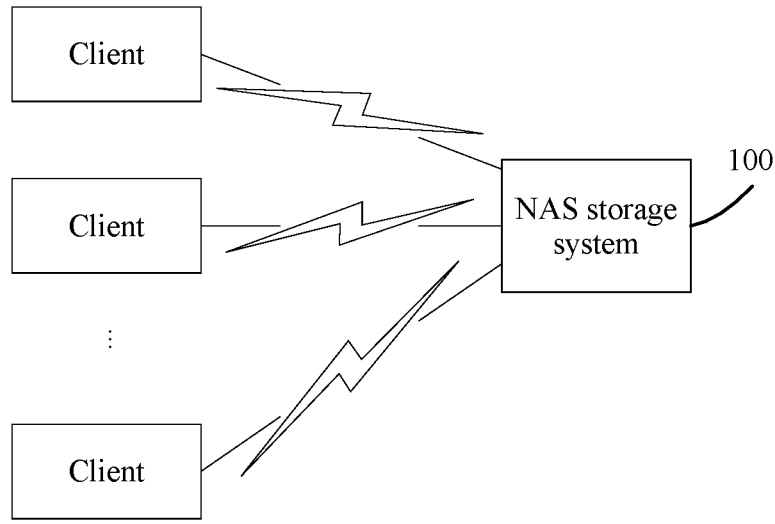
FIG. 1 is a schematic architectural diagram of a storage system according to an embodiment of the present disclosure.

FIG. 1 is a schematic architectural diagram of a storage system according to an embodiment of the present disclosure. The storage system may be a NAS storage system or a storage area network (SAN) storage system. The NAS storage system is used as an example for description in the present disclosure. As shown in FIG. 1, a user communicates with a NAS storage system 100 using a client. The client may be a terminal device or various types of servers. The NAS storage system 100 provides data to the client for access using a network and a file sharing protocol. Used protocols include a transmission control protocol (TCP) protocol used for data transmission, an internet protocol (IP), and a common internet file system (CIFS) protocol and a network file system (NFS) protocol used for a network file service.

The terminal device in this embodiment of the present disclosure includes a tablet computer, a notebook computer, a mobile internet device, a palmtop computer, a desktop computer, a mobile phone, or a terminal device in another product form.

The NAS storage system 100 in this embodiment of the present disclosure may be a file server, or may be a storage device such as a computer or a desktop computer.

A directory tree implemented based on a file system includes a root directory, a subdirectory, and a file below the subdirectory, and the root directory or the subdirectory may not only include a file, but also include a lower-level subdirectory. By analogy, a directory tree of a multi-level directory structure is formed.

Based on functions of nodes, nodes in the directory tree include a mount node, a directory node, and a file node. Based on structures of nodes, the directory tree includes a root node, an intermediate node, and a leaf node. The mount node is the root node of the directory tree, the directory node is the intermediate node of the directory tree, and the file node is the leaf node of the directory tree. When each node except the root node serves as a child node, the child node has its own parent node. When each node except the leaf node serves as a parent node, the parent node has its own child node. In the directory tree, nodes to which each level of subdirectories and files below a directory corresponding to a parent node belong are all child nodes of the parent node.

Path information of each node in the directory tree is used to indicate all nodes on an access branch from the root node of the directory tree to the node, that is, all the nodes on the access branch of the node include the node and all parent nodes of the node in a path of the node. The access branch from the root node to the node is a path from the root node to the node. A location of the node in the directory tree and locations of all the nodes in the path in the directory tree may be identified based on the path from the root node to the node. All subdirectories and files below a directory corresponding to each node in the path separately belong to different directory levels. In a path of each node in the directory tree, a directory level of a directory corresponding to a parent node is higher than directory levels of directories separately corresponding to all child nodes that belong to the parent node. In a path of a to-be-accessed node, a directory corresponding to the to-be-accessed node has a lowest directory level, and a directory corresponding to a root node has a highest directory level. In the directory tree, in a path of each node, all nodes except the node itself are parent nodes of the node.

Figure 2:
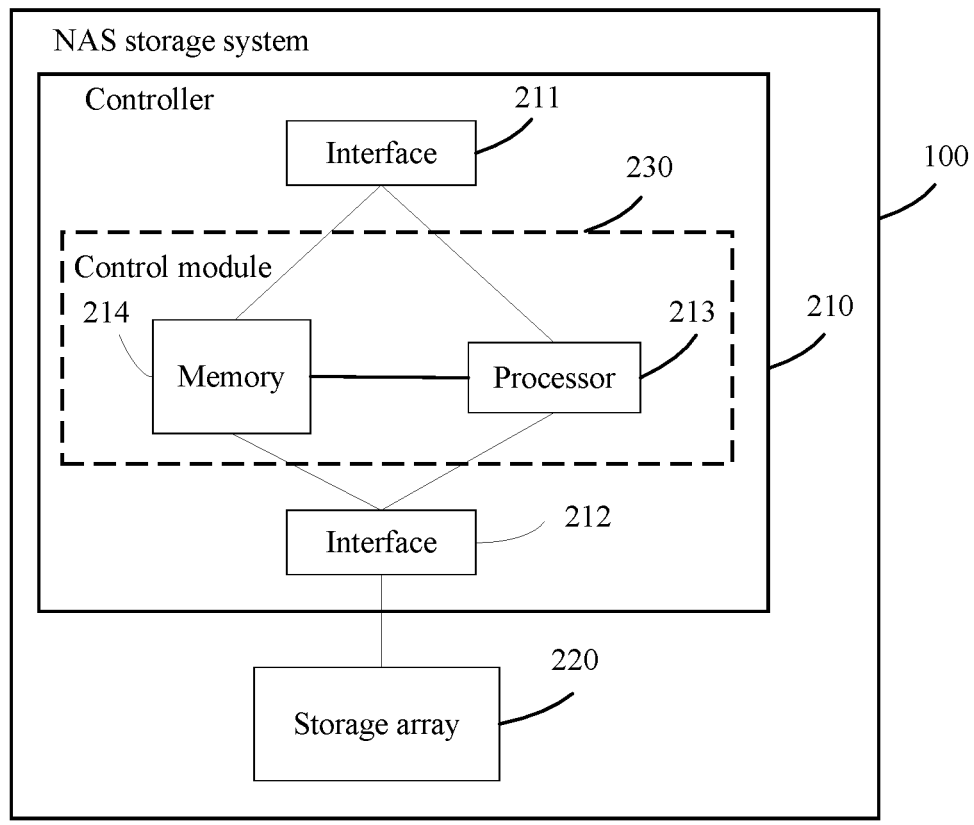
FIG. 2 is a schematic structural diagram of a network-attached storage (NAS) system according to an embodiment of the present disclosure.

FIG. 2 is a schematic structural diagram of a NAS storage system 100 according to an embodiment of the present disclosure. The NAS storage system 100 is used for storage and includes a controller 210 and a storage array 220.

The controller 210 is configured to receive a data access request from a client, perform authentication based on the received access request, determine location information of to-be-accessed data in the storage array 220 after the authentication succeeds, and initiate access to data in the storage array 220.

The controller 210 is further configured to set access permission for a node in a directory tree. When the access permission is being set, a permission record is stored, and the permission record describes access permission of the client for the node. The permission record includes an ACE, and the ACE records content such as an access permission type of a node, an object that can access the node, and access permission of the object that can access the node and that is for the node.

The storage array 220 is configured to store data. The controller 210 performs authentication on the access request. After the authentication succeeds, the controller 210 accesses data of a to-be-accessed node.

The storage array 220 is further configured to store metadata of the data. The metadata describes the stored data, and includes standard attribute data, extended attribute data, and layout attribute data. The standard attribute data is used to describe standard attributes such as a size and a modification time of the data. The layout attribute data is used to describe a storage location of the data. The extended attribute data includes data describing access permission for a node.

In an existing solution, ACL permission is set by traversing all nodes included in a directory tree. This permission setting mechanism consumes a long time, affecting service processing efficiency. In this embodiment of the present disclosure the following solution is proposed to set ACL permission for a node in a directory tree by following a POSIX standard semantics.

The present disclosure proposes a method for quickly setting ACL permission for a directory tree. In this method, only ACL permission for a parent node of a directory tree is set, and a semantic type identifier is stored using a semantic type parameter in order to identify a semantic type followed by access permission for the parent node. The semantic type parameter is used to distinguish between two semantic types, a permission root type and a private type, where the permission root type indicates that all files and all subdirectories below a directory corresponding to the parent node inherit the ACL permission for the parent node, and the private type indicates that all the files and all the subdirectories below the directory corresponding to the parent node do not inherit the ACL permission for the parent node. ACL permission data of each node may be stored in metadata of the node. In another implementation, ACL permission data of each node may alternatively be stored in metadata of a root node of the directory tree.

The present disclosure proposes a method for quickly setting ACL permission for a directory tree. When a semantic type parameter indicates that a semantic type followed by access permission for the parent node is a permission root type, all files and all subdirectories below a directory corresponding to the parent node inherit ACL permission for the parent node. Therefore, only the ACL permission for the parent node needs to be set. It is unnecessary to traverse all the subdirectories or files below the parent node to separately set ACL permission for each subdirectory or file below the parent node, thereby improving efficiency of setting ACL permission for the directory tree. In this case, the ACL permission is set for the parent node, and the ACL permission does not need to be repeatedly set for the subdirectories and the files below the directory corresponding to the parent node, thereby reducing storage space overheads. When the semantic type parameter indicates that the semantic type followed by the access permission for the parent node is the private type, all the files and the subdirectories below the directory corresponding to the parent node do not inherit ACL permission for the parent node obtained after a permission setting operation is currently performed on the parent node. In this case, a manner of setting ACL permission for a node that follows a POSIX standard semantics may be implemented.

According to the method for quickly setting ACL permission for a directory tree provided in the present disclosure, the semantic type followed by the access permission for the parent node is identified using the semantic type parameter. When the ACL permission for the parent node is of the permission root type, because all the files and all the subdirectories below the directory corresponding to the parent node inherit the ACL permission for the parent node, when any file or subdirectory below the directory corresponding to the parent node is being accessed, only all nodes in a path from a to-be-accessed file or subdirectory to a root node need to be queried in order to find a node that has latest ACL permission. When the node that has the latest ACL permission is the parent node of the to-be-accessed file or subdirectory, because the semantic type followed by the ACL permission for the parent node that has the latest ACL permission is the permission root type, and ACL permission for the to-be-accessed file or subdirectory inherits the ACL permission for the parent node that has the latest ACL permission, the latest ACL permission for the parent node that has the latest ACL permission may be used as the ACL permission for the to-be-accessed file or subdirectory.

In addition, according to the method for setting ACL permission for a directory tree provided in the present disclosure, when the semantic type parameter indicates that the semantic type followed by the access permission for the parent node is the private type, all the files and all the subdirectories below the directory corresponding to the parent node do not inherit the ACL permission for the parent node. Therefore, when any file or subdirectory below the directory corresponding to the parent node is being accessed, only a to-be-accessed node to which a to-be-accessed file or subdirectory belongs, and all parent nodes that have the permission root type need to be searched in all nodes in a path from the to-be-accessed file or subdirectory to the root node in order to find a node that has latest ACL permission. When the node that has the latest ACL permission is the parent node of the to-be-accessed file or subdirectory, because the semantic type followed by the ACL permission for the parent node that has the latest ACL permission is the permission root type, and ACL permission for the to-be-accessed file or subdirectory inherits the ACL permission for the parent node that has the latest ACL permission, the latest ACL permission for the parent node that has the latest ACL permission may be used as the ACL permission for the to-be-accessed file or subdirectory.

According to the method for setting ACL permission for a directory tree provided in the present disclosure, ACL permission may be modified for a node set with ACL permission. Each time ACL permission is set for a node in the directory tree, a permission version number is set for the ACL permission for the node.

According to the method for setting ACL permission for a directory tree provided in the present disclosure, the storage system 100 may configure ACL permission of two semantic types for any node of the directory tree, that is, separately configure a corresponding permission version number for ACL permission of each semantic type that is followed by the node.

When a node in the directory tree supports ACL permission of two semantic types, if permission version numbers of ACL permission of two semantic types of a same node are the same, ACL permission of a node that follows a semantic type of the private type is ACL permission that is latest set for the node. When any file or subdirectory below a directory corresponding to a parent node is being accessed, if the any file or subdirectory below the directory corresponding to the parent node has ACL permission of two semantic types, ACL permission of a semantic type of a node with a latest permission version number is ACL permission for the node.

If a node in the directory tree supports ACL permission of two semantic types, when any file or subdirectory below a directory corresponding to a parent node is being accessed, only a to-be-accessed node to which a to-be-accessed file or subdirectory belongs, and all parent nodes that have the permission root type need to be queried in all nodes in a path from the to-be-accessed file or subdirectory to the root node. If there is a parent node that follows two semantic types, regardless of sizes of permission version numbers of the two semantic types followed by the parent node, it is also necessary to query ACL permission of the permission root type on the parent node that has the two semantic types in order to search for a node that has latest ACL permission in the to-be-accessed node and all the parent nodes that have the permission root type. When the node that has the latest ACL permission is the parent node of the to-be-accessed file or subdirectory, because the semantic type followed by the ACL permission for the parent node that has the latest ACL permission is the permission root type, and ACL permission for the to-be-accessed file or subdirectory inherits the ACL permission for the parent node that has the latest ACL permission, the latest ACL permission for the parent node that has the latest ACL permission may be used as the ACL permission for the to-be-accessed file or subdirectory.

In the present disclosure, a permission version number is allocated, using a global version parameter, to a node to be set with permission. When the semantic type is the permission root type, the permission version number of the node to be set with permission is a latest global version parameter obtained after a currently recorded global version parameter is updated. When the semantic type is the private type, the permission version number of the node to be set with permission is the currently recorded global version parameter. Global version parameters are set incrementally or decrementally, and each global version number represents one permission setting operation on any node of the directory tree. When the semantic type is the private type, the permission version number of the node to be set with permission is the currently recorded global version parameter. Therefore, if a permission type of a node set with ACL permission previous time is the permission root type, and the semantic type followed by the node to be set with permission current time is the private type, a permission version number of ACL permission for the node to be set with permission current time is the same as a permission version number of the node set with ACL permission previous time. If the node set with ACL permission previous time is a parent node of the node to be set with permission current time, in a process of determining ACL permission for a to-be-accessed node, if the to-be-accessed node and the node to be set with permission current time are a same node, in the to-be-accessed node and the parent node that have a same permission version number, the to-be-accessed node is a node that has latest ACL permission.

In another implementation, there is no need to distinguish whether the semantic type is the permission root type or the private type, and the permission version number of the node to be set with permission is the latest global version parameter obtained after the currently recorded global version parameter is updated. In this case, no ACL permission with same permission version numbers exists.

In addition, in the present disclosure, if a node in the directory tree needs to be moved, before the to-be-moved node is moved, nodes that have latest permission in all nodes indicated by path information of the to-be-moved node before and after the to-be-moved node is moved are separately determined. After the to-be-moved node is moved, when the to-be-moved node or any child node of the to-be-moved node is being accessed, if a permission record is set for any node in all nodes indicated by path information of the to-be-accessed node after the to-be-moved node is moved, access permission for the to-be-accessed node inherits access permission for the to-be-accessed node after moving, and the access permission for the to-be-accessed node after moving inherits access permission for a node that has latest permission in the to-be-accessed node and all parent nodes of the permission root type after moving. If no permission record is set for all the nodes indicated by the path information of the to-be-accessed node after the to-be-moved node is moved, the access permission for the to-be-accessed node is access permission for the to-be-accessed node before moving, and the access permission for the to-be-accessed node before moving inherits access permission for a node that has latest permission in the to-be-accessed node and all parent nodes having the permission root type before moving. After the to-be-moved node is moved, no permission record is set for all the nodes indicated by the path information of the to-be-accessed node, and the access permission for the to-be-accessed node is the access permission for the to-be-accessed node before moving, which complies with a stipulation defined in the POSIX semantics that moving a node does not change access permission for the moved node and any child node below the moved node.

As shown in FIG. 2, the controller 210 includes an interface 211, an interface 212, and a control module 230. The control module 230 separately communicates with the interface 211 and the interface 212. In the controller 210, the interface 211 is configured to communicate with the client, and the interface 212 is configured to communicate with the storage array 220. The control module 230 is configured to set access permission for the node in the directory tree, and is configured to perform authentication on access permission for the to-be-accessed node. The control module 230 performs authentication on the access permission for the to-be-accessed node. After the authentication succeeds, the control module 230 accesses data of the to-be-accessed node.

As shown in FIG. 2, the control module 230 includes a processor 213 and a memory 214. The processor 213 is configured to set access permission for a node in the directory tree, and is configured to perform authentication on access permission for a to-be-accessed node. The processor 213 performs authentication on the access permission for the to-be-accessed node. After the authentication succeeds, the processor 213 accesses data of the to-be-accessed node.

The memory 214 includes a high-speed random access memory (RAM), and may further include a nonvolatile memory (NVM), for example, at least one magnetic disk memory. It may be understood that the memory 214 may be a machine readable medium capable of storing program code, for example, a RAM, a magnetic disk, a hard disk, a solid state disk (SSD), or an NVM.

The memory 214 is configured to temporarily store information sent from the client.

The processor 213 may be any computing device, a general-purpose central processing unit (CPU), a microprocessor, a programmable controller, an application-specific integrated circuit (ASIC), or one or more integrated circuits for controlling execution of the foregoing solution program.

The following describes in detail a function of each part of the NAS storage system 100 in the present disclosure using a structure of the NAS storage system 100 shown in FIG. 2.

In the present disclosure, the interface 211 is configured to receive a permission setting request sent by the client. The permission setting request is used to request to set access permission for a node to be set with permission in a directory tree of a file system.

The permission setting request includes an identifier, a semantic type identifier, and a permission record of the node to be set with permission in the directory tree. The semantic type includes a permission root type and a private type. The permission setting request is used to instruct the processor 213 to obtain a currently recorded global version parameter, and allocate, based on the currently recorded global version parameter, a permission version number to the node to be set with permission. When the semantic type is the permission root type, the permission version number of the node to be set with permission is a latest global version parameter obtained after the currently recorded global version parameter is updated. When the semantic type is the private type, the permission version number of the node to be set with permission is the currently recorded global version parameter. Global version parameters are set incrementally or decrementally, and each global version number represents one permission setting operation on any node of the directory tree.

In the present disclosure, the processor 213 is configured to set, based on the permission setting request, access permission for the node to be set with permission. The processor 213 is configured to obtain the currently recorded global version parameter, and allocate, based on the currently recorded global version parameter, the permission version number to the node to be set with permission. The processor 213 is further configured to store the identifier, the semantic type identifier, the permission version number, and the permission record of the node to be set with permission, where when the semantic type is the permission root type, a permission record of a child node of the node to be set with permission inherits a permission record obtained after a current permission setting operation on the node to be set with permission, and when the semantic type is the private type, the permission record obtained after the current permission setting operation on the node to be set with permission does not affect permission records of all child nodes of the node to be set with permission.

When a semantic type parameter indicates that a semantic type followed by access permission for the parent node is the permission root type, all files and all subdirectories below a directory corresponding to the parent node inherit ACL permission for the parent node. Therefore, only the ACL permission for the parent node needs to be set. It is unnecessary to traverse all the subdirectories or files below the parent node to separately set ACL permission for each subdirectory or file below the parent node, thereby improving efficiency of setting ACL permission for the directory tree. In this case, the ACL permission is set for the parent node, and the ACL permission does not need to be repeatedly set for the subdirectories and the files below the directory corresponding to the parent node, thereby reducing storage space overheads. When the semantic type parameter indicates that the semantic type followed by the access permission for the parent node is the private type, all the files and the subdirectories below the directory corresponding to the parent node do not inherit ACL permission for the parent node obtained after a permission setting operation is currently performed on the parent node. In this case, a manner of setting ACL permission for a node that follows a POSIX standard semantics may be implemented. Therefore, in the method for quickly setting ACL permission for a directory tree provided in the present disclosure, the POSIX standard semantics is followed while efficiency of setting ACL permission for the directory tree is improved, and storage space overheads are reduced. In this implementation, if a value is used to represent a value of the global version parameter, a larger value indicates newer access permission.

In this embodiment of the present disclosure, the permission setting request may further include path information of the node to be set with permission, and the path information of the node to be set with permission indicates all nodes on an access branch from the root node to the node to be set with permission. In the present disclosure, a correspondence among an identifier, a semantic type identifier, a permission version number, path information, and a permission record of a node set with access permission is stored by setting a global ACL. The global ACL further includes the global version parameter. The global ACL is stored in metadata of the root node of the directory tree.

In this embodiment of the present disclosure, the identifier, the semantic type identifier, the permission version number, and the permission record of the node to be set with permission may be stored in metadata of the node to be set with permission, where the metadata of the node to be set with permission further includes the path information of the node to be set with permission, the path information of the node to be set with permission indicates all the nodes on the access branch from the root node to the node to be set with permission, and in the metadata of the node to be set with permission, and the identifier, the semantic type identifier, the path information, the permission version number, and the permission record of the node to be set with permission form one correspondence. In the global ACL, the correspondence formed by the identifier, the semantic type identifier, the path information, the permission version number, and the permission record of the node to be set with permission may be a part of the metadata of the node to be set with permission.

In this embodiment of the present disclosure, the interface 211 is further configured to receive a global ACL creation request sent by the client. The global ACL creation request is used to instruct the processor 213 to create the global ACL and set an initial global version parameter for the newly created global ACL.

The processor 213 is configured to create the global ACL based on the global ACL creation request. The created global ACL stores the global version parameter. A value of the global version parameter in the created global ACL is an initial value, and the initial value of the global version parameter is 0, or may be another value or letter or another symbol identifier.

Figure 3:
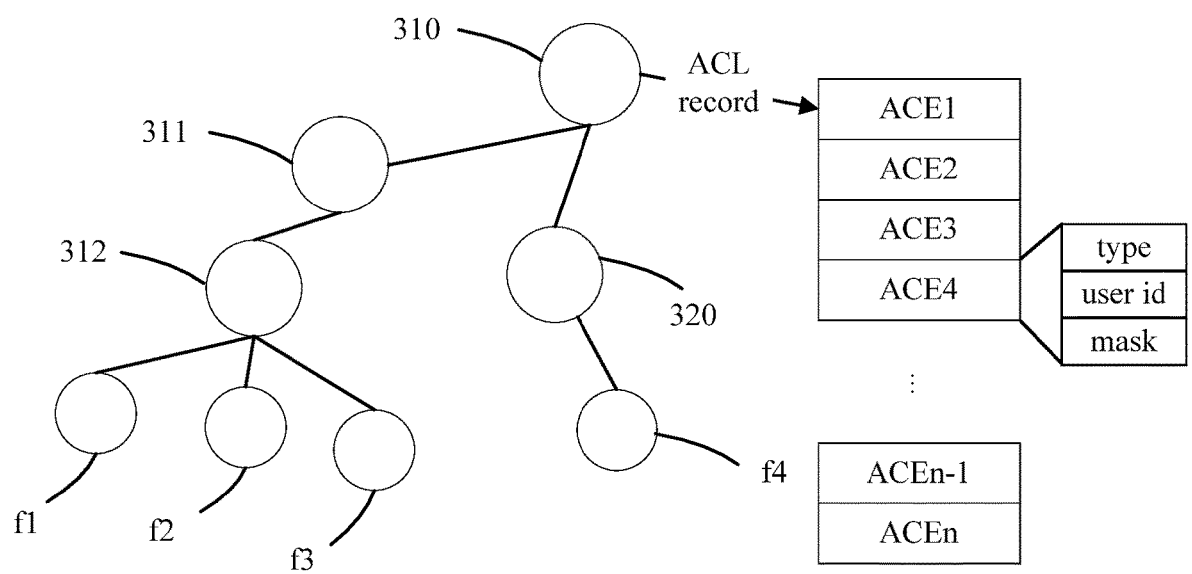
FIG. 3 is a schematic diagram of an organization form of a directory tree according to an embodiment of the present disclosure.

FIG. 3 is a schematic diagram of an organization form of a directory tree according to an embodiment of the present disclosure. As shown in FIG. 3, a directory tree includes a root node 310, an intermediate node 311, an intermediate node 312, an intermediate node 320, a leaf node f1, a leaf node f2, a leaf node f3, and a leaf node f4.

After the global ACL is created and before the access permission is set for the node to be set with permission, the created global ACL may be represented by Table 1. The global ACL shown in Table 1 includes the global version parameter, and a value of an initial global version parameter that is set for the newly created global ACL is 0 shown in Table 1. The global ACL shown in Table 1 is further used to store an identifier of each node in the directory tree of the file system, path information of each node, a semantic type identifier of each node, a permission version number of each node, and a permission record of each node. The global ACL shown in Table 1 may be used to store permission of different semantic types of a same node. If a node has permission of different semantic types, and permission version numbers of the different semantic types are the same, when the node is being accessed, permission that is latest set for the node is permission of the private type.

If a path of a node is determined using identifiers of all nodes in the path of the node, path information of the node includes the identifier of each node in the file system. For example, each node is identified using a number, and an identifier of a root node shown in Table 1 is a number 310. Therefore, path information of the root node 310 includes the number 310 in the identifier of the root node. Further, a correspondence among the global version parameter in the created global ACL, the identifier of each node in the file system, and path information of each node is shown in Table 1. As shown in Table 1, the global ACL may be further used to store a semantic type identifier, a permission record, and a permission version number of a node to be set with ACL permission. After the global ACL is created, if no ACL permission is set for the node in the directory tree, the semantic type identifier, the permission record, and the permission version number stored in the global ACL are empty.

TABLE 1

| Global version parameter | Identifier of a node | Path information | Semantic type identifier | Permission version number | Permission record |
|---|---|---|---|---|---|
| 0 | Root node 310 | \310 | | | |
| | Intermediate node 311 | \310\311 | | | |
| | Intermediate node 312 | \310\311\312 | | | |
| | Intermediate node 320 | \310\320 | | | |
| | Leaf node f1 | \310\311\312\f1 | | | |
| | Leaf node f2 | \310\311\312\f2 | | | |
| | Leaf node f3 | \310\311\312\f3 | | | |
| | Leaf node f4 | \310\320\f4 | | | |

If the path of each node is unique, the node may be identified using path information of the node. Therefore, the correspondence among the global version parameter, the identifier of each node in the file system, and the path information of each node may be shown in Table 2.

TABLE 2

| Global version parameter | Identifier of a node | Semantic type identifier | Permission version number | Permission record |
|---|---|---|---|---|
| 0 | \310 | | | |
| | \310\311 | | | |
| | \310\311\312 | | | |
| | \310\320 | | | |
| | \310\311\312\f1 | | | |
| | \310\311\312\f2 | | | |
| | \310\311\312\f3 | | | |
| | \310\320\f4 | | | |

After the global ACL is created, the user sets access permission for a node in the directory tree using the client.

The processor 213 is further configured to store the identifier, the semantic type identifier, the permission version number, and the permission record of the node to be set with permission into the global ACL.

The processor 213 is further configured to obtain access permission for a to-be-accessed node before accessing data of the to-be-accessed node. When a permission version number of the to-be-accessed node is the latest in permission version numbers of the to-be-accessed node and all parent nodes of the to-be-accessed node and that have the permission root type, the access permission for the to-be-accessed node is a recorded permission record of the to-be-accessed node. When the permission version number of the to-be-accessed node is not the latest in the permission version numbers of the to-be-accessed node and all the parent nodes of the to-be-accessed node and that have the permission root type, the access permission for the to-be-accessed node inherits a permission record corresponding to a parent node that is of the to-be-accessed node and that has a latest permission version number.

In the present disclosure, the storage system organizes access permission data of all nodes of the directory tree using the global ACL. The global ACL stored in the storage array 220 is used to describe the access permission for the node to be set with permission. Further, the global ACL is used to store a value of the updated global version parameter, and is used to store the correspondence among the identifier, the path information, the semantic type identifier, the permission version number, and the permission record of the node to be set with permission. The identifier, the path information, the semantic type identifier, the permission version number, and the permission record of the node to be set with permission form a correspondence, and the correspondence is stored in the global ACL. Because the global ACL is stored in the metadata of the root node in an implementation of the present disclosure, the identifier, the path information, the semantic type identifier, the permission version number, and the permission record of the node to be set with permission for the directory tree can be obtained only by indexing the metadata of the root node of the directory tree. This provides a simple access channel for obtaining the permission record, the semantic type identifier, the permission version number, and the path information of the node of the directory tree. In another implementation, the global version parameter in the global ACL may be stored in the metadata of the root node, and an identifier, path information, a semantic type identifier, a permission version number, and a permission record of each node in the global ACL may be stored in metadata of the node itself. Further, a storage location and an index manner of the permission record, the semantic type identifier, the permission version number, and the path information of each node are not further limited in this embodiment.

Figure 4:
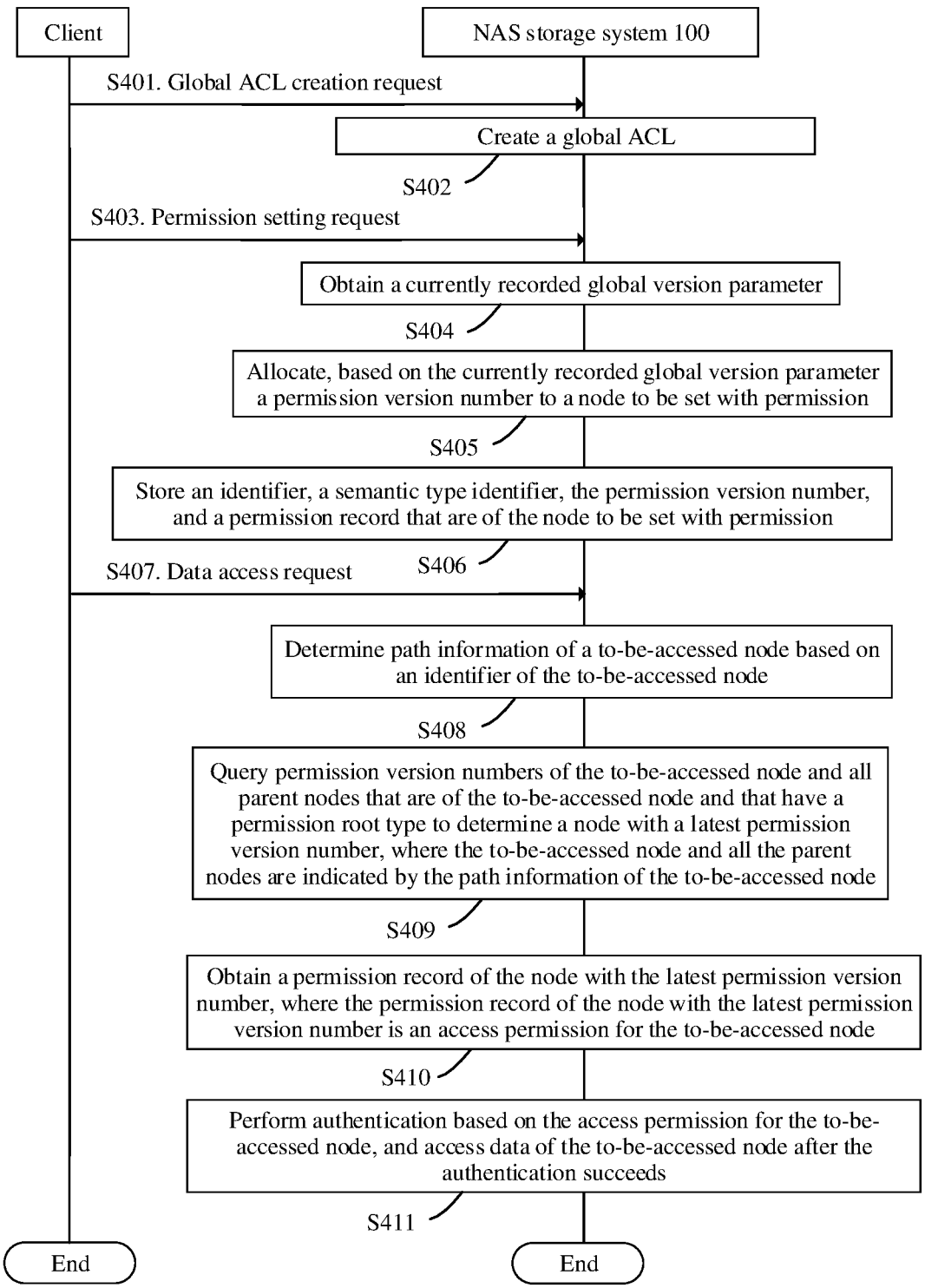
FIG. 4 is a flowchart of a data access method according to an embodiment of the present disclosure.

FIG. 4 is a flowchart of a data access method according to an embodiment of the present disclosure. As shown in FIG. 4, the data access method provided in this embodiment is performed by the NAS storage system 100 shown in FIG. 2. Further, the method may be performed by the control module 230 in the NAS storage system 100 or the processor 213 in the control module 230 shown in FIG. 2. A method in which after a directory tree is created, how to set access permission for the created directory tree, and then how to access data of a to-be-accessed node in the created directory tree is described in detail, and includes the following steps.

Step S401. The NAS storage system 100 receives a global ACL creation request sent by a client.

In the present disclosure, the global ACL creation request is used to instruct the NAS storage system 100 to create a global ACL.

A user may send the global ACL creation request to the NAS storage system 100 using the client. The global ACL creation request includes an identifier of a root node of a directory tree.

In another implementation of implementing the global ACL creation request, the global ACL creation request includes not only the identifier of the root node of the directory tree, but also includes path information of each node of the directory tree and an identifier of each node. The path information of each node indicates all nodes on an access branch from the root node to the node, that is, is used to indicate a path from the root node to the node. According to the path, a location of the node in the directory tree and a location of an intermediate node in the path in the directory tree may be found. Each node except the root node in the path belongs to one parent node, each node except a leaf node in the path has a child node of the node itself, and subdirectories and files below a directory corresponding to each node except a leaf node belong to different directory levels.

If an identifier of each node in the path is used to represent path information of the node, the global ACL creation request may include only the path information of each node of the directory tree.

Step S402. The NAS storage system 100 creates a global ACL. Further, the NAS storage system 100 creates a global version parameter, and stores the global version parameter into the global ACL, where a value of the global version parameter is an initial value.

In an optional implementation, based on the description in step S401, in another implementation of implementing the global ACL creation request, because the global ACL creation request may include the path information of each node in the directory tree and the identifier of each node, when the NAS storage system 100 creates the global ACL, the NAS storage system 100 stores a correspondence between the path information of each node in the directory tree and the identifier of the node into the global ACL. For example, a global ACL shown in Table 3 stores the correspondence between the path information of each node in the directory tree and the identifier of the node. The global ACL shown in Table 3 further includes a global version parameter. Based on the directory tree shown in FIG. 3, content of the global ACL created in this step is executed as shown in Table 3.

TABLE 3

| Global version parameter | Identifier of a node | Path information | Semantic type identifier | Permission version number | Permission record |
|---|---|---|---|---|---|
| 0 | Root node 310 | \310 | | | |
| | Intermediate node 311 | \310\311 | | | |
| | Intermediate node 312 | \310\311\312 | | | |
| | Intermediate node 320 | \310\320 | | | |
| | Leaf node f1 | \310\311\312\f1 | | | |
| | Leaf node f2 | \310\311\312\f2 | | | |
| | Leaf node f3 | \310\311\312\f3 | | | |
| | Leaf node f4 | \310\320\f4 | | | |

If an identifier of each node in the path is used to represent path information of the node, the global ACL stores the global version parameter and the path information of each node and does not need to store the identifier of the node.

The global version parameter in the created global ACL is stored in metadata of the root node. The correspondence between the identifier of each node in the created global ACL and the path information may be stored in the metadata of the root node together with the global version parameter, or may be separately stored in metadata of the node itself. The identifier of each node and the path information of each node may be pre-stored in metadata of the node itself after the NAS storage system 100 creates the directory tree and before the NAS storage system 100 creates the ACL.

Step S403. The NAS storage system 100 receives a permission setting request. The permission setting request is used to request to set access permission for a node in the directory tree of the file system, and the permission setting request includes an identifier, a semantic type identifier, and a permission record of a node to be set with permission. The semantic type includes a permission root type and a private type. As shown in FIG. 3, the permission record includes several ACEs, and each ACE includes content such as a control type, permission (designated as mask), and a user identifier (designated as id). The control type includes allowed, denied, and the like. The user identifier indicates a user or a type of users. The permission (mask) indicates access permission of a corresponding user, and is usually represented in a mask manner.

Further, the user sends the permission setting request using the client.

Based on the implementation in step S401, if the global ACL creation request received by the NAS storage system 100 includes the path information of each node of the directory tree and the identifier of each node, the newly created global ACL includes the path information of each node of the directory tree and the identifier of each node. After receiving the permission setting request, the NAS storage system 100 stores the semantic type identifier and the permission record of the node to be set with permission into the global ACL, where the identifier, path information, the semantic type identifier, and the permission record of the node to be set with permission form a correspondence.

Based on the implementation in step S401, if the global ACL creation request received by the NAS storage system 100 does not include the path information of each node of the directory tree and the identifier of each node, the newly created global ACL does not include the path information of each node of the directory tree and the identifier of each node. An optional implementation of the permission setting request in step S403 of the present disclosure is as follows. The permission setting request includes not only the identifier, the semantic type identifier, and the permission record of the node to be set with permission, but also includes the path information of the node to be set with permission, and the path information of the node to be set with permission indicates all nodes on an access branch from the root node to the node to be set with permission. Therefore, after receiving the permission setting request, the NAS storage system 100 stores the path information of the node to be set with permission into the global ACL. The identifier, the semantic type identifier, the path information, and the permission record of the node to be set with permission form a correspondence.

Based on the implementation in step S401, if the global ACL creation request received by the NAS storage system 100 does not include the path information of each node of the directory tree and the identifier of each node, the newly created global ACL does not include the path information of each node of the directory tree and the identifier of each node. An optional implementation of storing the correspondence formed by the identifier, the path information, the semantic type identifier, and the permission record of the node to be set with permission is storing the correspondence among the identifier, the semantic type identifier, the path information, and the permission record of the node to be set with permission into the metadata of the node to be set with permission.

Based on the directory tree shown in FIG. 3, for example, the intermediate node 311 is the node to be set with permission. In this implementation, a semantic type of permission that is set for the intermediate node 311 is the permission root type.

Step S404. The NAS storage system 100 obtains a currently recorded global version parameter.

Further, the NAS storage system 100 may query the global ACL to obtain the currently recorded global version parameter.

The global ACL is stored in the metadata of the root node of the directory tree, and the global ACL stores the global version parameter. Based on content of the global ACL of the directory tree shown in Table 3, it is determined, based on content of the global ACL created by the NAS storage system 100 in step S402, that a value of the created global version parameter is 0.

Step S405. The NAS storage system 100 allocates, based on the currently recorded global version parameter a permission version number to the node to be set with permission.

In the present disclosure, when the semantic type is the permission root type, the permission version number of the node to be set with permission is a latest global version parameter obtained after the currently recorded global version parameter is updated. The NAS storage system 100 updates the value of the global version parameter. Further, the NAS storage system 100 may increase or decrease the value of the global version parameter based on a preset granularity. The preset granularity may be 1 or 2, or may be another value greater than zero. Further, based on the directory tree shown in FIG. 3, for example, the intermediate node 311 is the node to be set with permission. In this implementation, a semantic type of permission that is set for the intermediate node 311 is the permission root type. Therefore, after the NAS storage system 100 increases the value of the global version parameter by 2, an obtained value of the global version parameter is 2. Therefore, the permission version number allocated by the NAS storage system 100 to the intermediate node 311 based on the currently recorded global version parameter is 2.

In the present disclosure, when the semantic type is the private type, an implementation of the permission version number of the node to be set with permission is that the permission version number of the node to be set with permission is the currently recorded global version parameter. Another implementation of the permission version number of the node to be set with permission is that the permission version number of the node to be set with permission is the latest global version parameter obtained after the currently recorded global version parameter is updated. In this case, the NAS storage system 100 updates the value of the global version parameter. Further, the value of the global version parameter may be increased or decreased based on a preset granularity, and the preset granularity may be 1 or another value greater than zero. Global version parameters are set incrementally or decrementally, and each global version number represents one permission setting operation on any node of the directory tree.

In the present disclosure, the permission version number of the node to be set with permission may be stored in the global ACL. In another implementation, the permission version number of the node to be set with permission may alternatively be stored in the metadata of the node to be set with permission.

Step S406. The NAS storage system 100 stores the identifier, the semantic type identifier, the permission version number, and the permission record of the node to be set with permission. When the semantic type is the permission root type, a permission record of a child node of the node to be set with permission inherits a permission record obtained after a current permission setting operation on the node to be set with permission.

In this implementation, if a permission type of the node to be set with permission is the permission root type, the specified global ACL includes the value of the updated global version parameter, and the identifier, the semantic type identifier, the permission version number, and the permission record of the node to be set with permission.

For example, a permission type of the intermediate node 311 is the permission root type. After a global ACL is set as shown in Table 4 for the directory tree shown in FIG. 3, the global ACL includes a value (2) of an updated global version parameter, and a semantic type identifier (permission root type), a permission version number (2), and a permission record (ACE1, ACE2, . . . , and ACEn) of the intermediate node 311.

TABLE 4

| Global version parameter | Identifier of a node | Path information | Semantic type identifier | Permission version number | Permission record |
| --- | --- | --- | --- | --- | --- |
| 2 | Root node 310 | \310 | | | |
| | Intermediate node 311 | \310\311 | Permission root type | 2 | ACE1, ACE2, . . . , and ACEn |
| | Intermediate node 312 | \310\311\312 | | | |
| | Intermediate node 320 | \310\320 | | | |
| | Leaf node f1 | \310\311\312\f1 | | | |
| | Leaf node f2 | \310\311\312\f2 | | | |
| | Leaf node f3 | \310\311\312\f3 | | | |
| | Leaf node f4 | \310\320\f4 | | | |

In another implementation, if the permission type of the node to be set with permission is the private type, and the permission version number is allocated, using a policy of not updating the value of the obtained currently recorded global version parameter, to the node to be set with permission of the private type, the specified global ACL includes the value of the global version parameter that is not updated, and the identifier, the semantic type identifier, the permission version number, and the permission record of the node to be set with permission. For example, if a permission type of the intermediate node 311 is the private type, after the global ACL is set as shown in Table 5 for the directory tree shown in FIG. 3, the global ACL includes a value (0) of a global version parameter that is not updated, and a semantic type identifier (private type), a permission version number (0), and a permission record (ACE1, ACE2, . . . , and ACEn) of the intermediate node 311.

TABLE 5

| Global version parameter | Identifier of a node | Path information | Semantic type identifier | Permission version number | Permission record |
| --- | --- | --- | --- | --- | --- |
| 0 | Root node 310 | \310 | | | |
| | Intermediate node 311 | \310\311 | Private type | 0 | ACE1, ACE2, . . . , and ACEn |
| | Intermediate node 312 | \310\311\312 | | | |
| | Intermediate node 320 | \310\320 | | | |
| | Leaf node f1 | \310\311\312\f1 | | | |
| | Leaf node f2 | \310\311\312\f2 | | | |
| | Leaf node f3 | \310\311\312\f3 | | | |
| | Leaf node f4 | \310\320\f4 | | | |

In another implementation, if the permission type of the node to be set with permission is the private type, and the permission version number is allocated, using a policy of updating the value of the obtained currently recorded global version parameter, to the node to be set with permission of the private type, the specified global ACL includes the value of the updated global version parameter, and the identifier, the semantic type identifier, the permission version number, and the permission record of the node to be set with permission. For example, if a permission type of the intermediate node 311 is the private type, after the global ACL is set as shown in Table 6, the global ACL includes a value (2) of an updated global version parameter, and a semantic type identifier (private type), a permission version number (2), and the permission record (ACE1, ACE2, . . . , and ACEn) of the intermediate node 311.

TABLE 6

| Global version parameter | Identifier of a node | Path information | Semantic type identifier | Permission version number | Permission record |
|---|---|---|---|---|---|
| 2 | Root node 310 | \310 | | | |
| | Intermediate node 311 | \310\311 | Private type | 2 | ACE1, ACE2, . . . , and ACEn |
| | Intermediate node 312 | \310\311\312 | | | |
| | Intermediate node 320 | \310\320 | | | |
| | Leaf node f1 | \310\311\312\f1 | | | |
| | Leaf node f2 | \310\311\312\f2 | | | |
| | Leaf node f3 | \310\311\312\f3 | | | |
| | Leaf node f4 | \310\320\f4 | | | |

In a method for quickly setting ACL permission for a directory tree proposed in the present disclosure, when a semantic type parameter indicates that a semantic type followed by access permission for a parent node is the permission root type (for example, a semantic type followed by the intermediate node 311 shown in Table 4 is the permission root type), after a permission setting operation is currently performed on the intermediate node 311, permission for the intermediate node 311 is latest permission. Because all files and all subdirectories below a directory corresponding to the parent node of the permission root type inherit ACL permission for the parent node, that is, all the lower-level child node 312, the leaf node f1, the leaf node f2, and the leaf node f3 of the intermediate node 311 inherit the ACL permission obtained after the current permission setting operation on the parent node, only the ACL permission for the parent node needs to be set, and it is unnecessary to traverse all subdirectory or files below the parent node to separately set ACL permission for each subdirectory or file below the parent node, thereby improving efficiency of setting ACL permission for the directory tree. In this case, the ACL permission is set for the parent node, and the ACL permission does not need to be repeatedly set for the subdirectories and the files below the directory corresponding to the parent node, thereby reducing storage space overheads. When the semantic type parameter indicates that the semantic type followed by the access permission for the parent node is the private type (for example, the semantic type followed by the intermediate node 311 shown in Table 5 or Table 6 is the private type), all the files and all the subdirectories below the directory corresponding to the parent node do not inherit the ACL permission for the parent node after a permission setting operation is currently performed on the parent node. In this case, a manner of setting ACL permission for a node that follows a POSIX standard semantics may be implemented. Therefore, in the method for quickly setting ACL permission for a directory tree provided in the present disclosure, the POSIX standard semantics is followed while efficiency of setting ACL permission for the directory tree is improved, and storage space overheads are reduced.

Step S407. The NAS storage system 100 receives a data access request.

The user sends the data access request using the client. The data access request is used to instruct to access data of a to-be-accessed node in the directory tree, and the data access request includes an identifier of the to-be-accessed node in the directory tree. The data requested for access belongs to the to-be-accessed node, and the to-be-accessed node is any node of the created directory tree. All or some nodes in the directory tree are set with permission records, and some of the nodes set with permission records in the directory tree may have ACL permission of two semantic types. In the present disclosure, a permission version number of a node not set with a permission record is considered as a minimum version number by default.

Based on the directory tree shown in FIG. 3, the following uses the intermediate node 312 as an example of the to-be-accessed node to describe in detail how the NAS storage system 100 accesses data of the intermediate node 312. After the NAS storage system 100 receives the data access request, a method for accessing the data of the to-be-accessed node includes the following steps.

Step S408. The NAS storage system 100 determines path information of the to-be-accessed node based on an identifier of the to-be-accessed node.

The NAS storage system 100 queries the global ACL or metadata of the to-be-accessed node, and determines the path information of the to-be-accessed node based on the identifier of the to-be-accessed node. The path information of the to-be-accessed node is used to indicate the to-be-accessed node and all parent nodes of the to-be-accessed node.

Before the user accesses data, the global ACL needs to be queried to obtain access permission for the to-be-accessed node to which the data belongs.

Step S409. The NAS storage system 100 queries permission version numbers of the to-be-accessed node and all parent nodes of the to-be-accessed node and that have the permission root type to determine a node with a latest permission version number, where the to-be-accessed node and all the parent nodes are indicated by the path information of the to-be-accessed node.

In this step, that the NAS storage system 100 queries permission version numbers of the to-be-accessed node and all parent nodes of the to-be-accessed node and that have the permission root type to determine a node with a latest permission version number, where the to-be-accessed node and all the parent nodes are indicated by the path information of the to-be-accessed node includes the following. The NAS storage system 100 compares, according to a preset traversal rule, the permission version numbers of the to-be-accessed node and all the parent nodes of the to-be-accessed node and that have the permission root type to determine the node with the latest permission version number, where the to-be-accessed node and all the parent nodes are indicated by the path information of the to-be-accessed node.

In the present disclosure, all nodes indicated by path information of each node in the directory tree separately belong to different directory levels. A directory level of a parent node in all the nodes indicated by the path information of each node in the directory tree is higher than a directory level of a child node that belongs to the parent node. The to-be-accessed node has a lowest directory level, and the root node has a highest directory level.

One case in which the NAS storage system 100 compares, according to a preset traversal rule, the permission version numbers of the to-be-accessed node and all the parent nodes of the to-be-accessed node and that have the permission root type to determine the node with the latest permission version number, where the to-be-accessed node and all the parent nodes are indicated by the path information of the to-be-accessed node is as follows. The NAS storage system 100 selects and compares, starting from the to-be-accessed node, permission version numbers of two nodes each time of all the nodes indicated by the path information of the to-be-accessed node to determine a node with a newer permission version number. The NAS storage system 100 determines, until the root node is compared through traversal in ascending order of the directory levels, that a node with a newer permission version number is the node with the latest permission version number.

Another case in which the NAS storage system 100 compares, according to a preset traversal rule, the permission version numbers of the to-be-accessed node and all the parent nodes of the to-be-accessed node and that have the permission root type to determine the node with the latest permission version number, where the to-be-accessed node and all the parent nodes are indicated by the path information of the to-be-accessed node is as follows. The NAS storage system 100 selects and compares, starting from the root node, permission version numbers of two nodes each time of all the nodes indicated by the path information of the to-be-accessed node to determine a node with a newer permission version number. The NAS storage system 100 determines, until the to-be-accessed node is compared through traversal in descending order of the directory levels, that a node with a newer permission version number is the node with the latest permission version number.

Step S410. The NAS storage system 100 obtains a permission record of the node with the latest permission version number, where the permission record of the node with the latest permission version number is the access permission for the to-be-accessed node.

In the present disclosure, when a permission version number of the to-be-accessed node is the latest in the permission version numbers of the to-be-accessed node and all the parent nodes of the to-be-accessed node and that have the permission root type, the access permission for the to-be-accessed node is a recorded permission record of the to-be-accessed node. When the permission version number of the to-be-accessed node is not the latest in the permission version numbers of the to-be-accessed node and all the parent nodes of the to-be-accessed node and that have the permission root type, the access permission for the to-be-accessed node inherits a permission record corresponding to a parent node that is of the to-be-accessed node and that has a latest permission version number.

Further, in the present disclosure, if the permission version number is represented using a number, the NAS storage system 100 queries the permission version numbers of all the nodes in the path, and determines that a node with a largest permission version number in the to-be-accessed node and all the parent nodes that have the permission root type is the node with the latest permission version number. If two nodes with a same permission version number exist, a node of the private type is the node with the latest permission version number. When the permission type of the to-be-accessed node is the private type, in this case, when the permission version number of the private type of the to-be-accessed node is greater than or equal to the permission version numbers of all the parent nodes that have the permission root type, the access permission for the to-be-accessed node is the permission record of the to-be-accessed node itself. If the permission version number of the private type of the to-be-accessed node is less than a permission version number of any parent node that has the permission root type, the access permission for the to-be-accessed node inherits a permission record of a parent node that has a largest permission version number in all the parent nodes of the to-be-accessed node and that have the permission root type.

Before the user accesses data, the user needs to obtain access permission for a node to which the data belongs, to obtain access permission for the data.

In the present disclosure, access permission is set for all or some nodes in the directory tree, and access permission for a node is described using a permission record.

All nodes indicated by the path information of the intermediate node 312 that is determined in step S408 include the intermediate node 312 and all parent nodes of the intermediate node 312, and all the parent nodes of the intermediate node 312 include the intermediate node 311 and the root node 310. Based on Table 4 determined in step S406, the intermediate node 311 has ACL permission of the permission root type, the root node is not set with ACL permission, and the intermediate node 312 is not set with ACL permission either. Therefore, the intermediate node 311 is the node with the largest permission version number in the to-be-accessed node and all the parent nodes that have the permission root type, namely, the node with the latest permission version number. Therefore, access permission for the intermediate node 312 inherits the permission record of the intermediate node 311 having the permission root type.

If ACL permission is set for all the root node 310, the intermediate node 311, and the intermediate node 312 before step S407, one case of the ACL permission for the directory tree after ACL permission is set is shown in Table 7. That is, a semantic type of the root node 310 is the permission root type, a permission version number of the root node 310 is 3, and the intermediate node 311 has two semantic types, the private type and the permission root type. For the intermediate node 311, the permission version number of the permission root type is 2, and the permission version number of the private type is also 2. In addition, the intermediate node 312 also has two semantic types, the private type and the permission root type. For the intermediate node 312, the permission version number of the permission root type is 1, and the permission version number of the private type is also 1. Therefore, when data of the intermediate node 312 is being accessed, access permission for the intermediate node 312 needs to be obtained first. The access permission for the intermediate node 312 is a permission record of a node that has a latest permission version number in the intermediate node 312 and all the parent nodes of the intermediate node 312 and that have the permission root type. The root node 310 and the intermediate node 311 serve as parent nodes of the intermediate node 312 and both have the permission root type, but the permission version number of the root node 310 with the permission root type is the latest, and the permission version number of the root node 310 is greater than the permission version numbers of both the semantic types of the intermediate node 312. Therefore, the access permission for the intermediate node 312 inherits a permission record of the root node 310 with the permission root type.

node 312 also has two semantic types, the private type and the permission root type. For the intermediate node 312, the permission version number of the permission root type is 1, and the permission version number of the private type is 3. Therefore, when data of the intermediate node 312 is being accessed, access permission for the intermediate node 312 needs to be obtained first. The access permission for the intermediate node 312 is a permission record of a node that has a latest permission version number in the intermediate node 312 and all the parent nodes of the intermediate node 312 and that have the permission root type. The intermediate node 311 serves as a parent node of the intermediate node 312 and has the permission root type, and the root node 310 serves as a parent node of the intermediate node 312 and does not have the permission root type. Therefore, the permission for the root node is not determined when the access permission for the intermediate node 312 is being determined. In addition, the intermediate node 312 has two semantic types, but the permission version number of the private type is the latest. Therefore, when the access per-

TABLE 7

| Global version parameter | Identifier of a node | Path information | Semantic type identifier | Permission version number | Permission record |
| --- | --- | --- | --- | --- | --- |
| 3 | Root node 310 | \310 | Permission root type | 3 | $ACE_1, ACE_2$ |
| | Intermediate node 311 | \310\311 | Permission root type | 2 | $ACE_3, ACE_4$ |
| | | | Private type | 2 | $ACE_{15}, ACE_6$ |
| | Intermediate node 312 | \310\311\312 | Permission root type | 1 | $ACE_{17}, ACE_8$ |
| | | | Private type | 1 | $ACE_{19}, ACE_{10}$ |
| | Intermediate node 320 | \310\320 | | | |
| | Leaf node f1 | \310\311\312\f1 | | | |
| | Leaf node f2 | \310\311\312\f2 | | | |
| | Leaf node f3 | \310\311\312\f3 | | | |
| | Leaf node f4 | \310\320\f4 | | | |

If ACL permission is set for all the root node 310, the intermediate node 311, and the intermediate node 312 before step S407, another case of the ACL permission for the directory tree after ACL permission is set is shown in Table 8. That is, a semantic type of the root node 310 is the private type, a permission version number of the root node 310 is 3, and the intermediate node 311 has two semantic types, the private type and the permission root type. For the intermediate node 311, the permission version number of the permission root type is 2, and the permission version number of the private type is also 2. In addition, the intermediate mission for the intermediate node 312 is being determined, the permission version number of the intermediate node 312 with the private type needs to be determined. Because the permission version number (2) of the intermediate node 311 with the permission root type is less than the permission version number (3) of the intermediate node 312 with the private type, the access permission for the intermediate node 312 is a permission record that is of the intermediate node 312 and that has the latest permission version number, namely, the permission record of the private type.

TABLE 8

| Global version parameter | Identifier of a node | Path information | Semantic type identifier | Permission version number | Permission record |
| --- | --- | --- | --- | --- | --- |
| 3 | Root node 310 | \310 | Private type | 3 | $ACE_1, ACE_2$ |
| | Intermediate node 311 | \310\311 | Permission root type | 2 | $ACE_3, ACE_4$ |
| | | | Private type | 2 | $ACE_{15}, ACE_6$ |

TABLE 8-continued

| Global version parameter | Identifier of a node | Path information | Semantic type identifier | Permission version number | Permission record |
|---|---|---|---|---|---|
| | Intermediate node 312 | \310\311\312 | Permission root type | 1 | $ACE_{17}$, $ACE_8$ |
| | | | Private type | 3 | $ACE_{19}$, $ACE_{10}$ |
| | Intermediate node 320 | \310\320 | | | |
| | Leaf node f1 | \310\311\312\f1 | | | |
| | Leaf node f2 | \310\311\312\f2 | | | |
| | Leaf node f3 | \310\311\312\f3 | | | |
| | Leaf node f4 | \310\320\f4 | | | |

Step S411. Perform authentication based on the access permission for the to-be-accessed node, and access data of the to-be-accessed node after the authentication succeeds.

Figure 5:
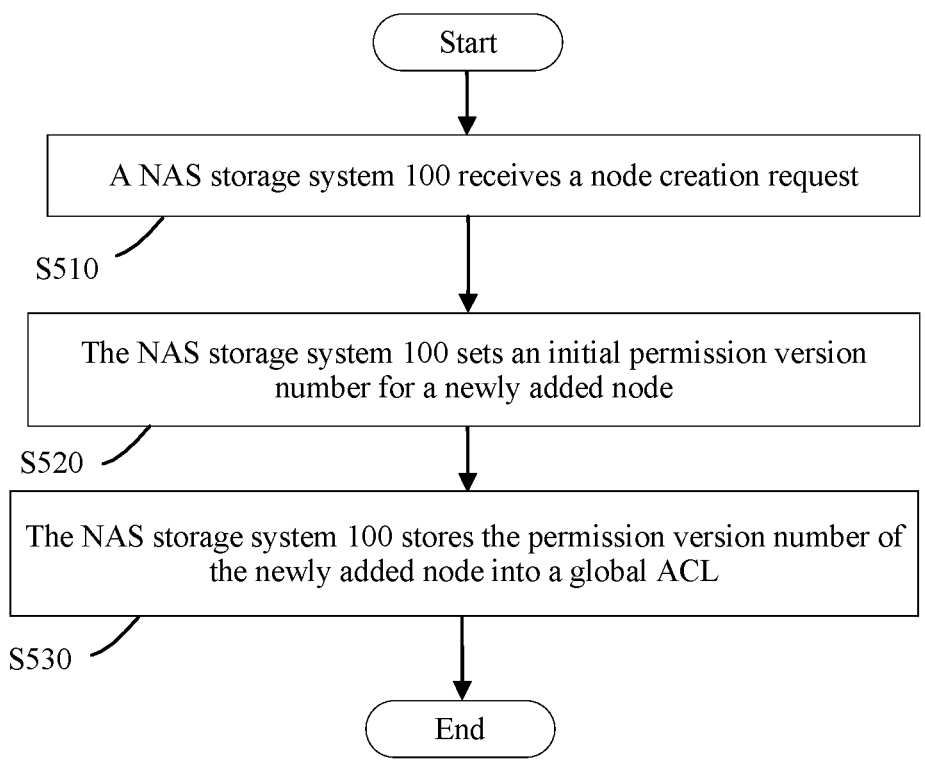
FIG. 5 is a flowchart of a method for setting access permission for a newly added node according to an embodiment of the present disclosure.

Based on the embodiment shown in FIG. 4, after step S402, that is, after the global ACL is created or the directory tree is created, when the user needs to change a directory tree with a created ACL or a directory tree without a created global ACL, for example, when a new directory node or file node needs to be added to the directory tree, the present disclosure provides a method for setting access permission to set access permission for the newly added directory node or file node in time. The following describes in detail a method for setting access permission for a node newly added to an existing directory tree. FIG. 5 is a flowchart of a method for setting access permission for a newly added node according to an embodiment of the present disclosure. As shown in FIG. 5, the method for setting access permission for a newly added node provided in this embodiment is performed by the NAS storage system 100 shown in FIG. 2. Further, the method may be performed by the control module 230 in the NAS storage system 100 or the processor 213 in the control module 230 shown in FIG. 2. The method for setting access permission for a newly added node includes the following steps.

Step S510. The NAS storage system 100 receives a node creation request.

A user may send the node creation request to the NAS storage system 100 using a client.

The node creation request includes an identifier and path information of a newly added node of the directory tree, and the path information of the newly added node indicates all nodes on an access branch from a root node to the newly added node.

The newly added node may be a directory node or may be a file node. For example, based on the directory tree shown in FIG. 3, the identifier of the newly added node is 313, and the path information of the newly added node is \310\311\313. It is determined, based on the path information of the newly added node, that the newly added node is a child node 313 that is newly added below the intermediate node 311.

In another implementation, if an identifier of each node in the path is used to represent a path of the node, the node creation request may include only the path information of the newly added node, because the path information of the newly added node includes the identifier of each node in the path. The identifier of the newly added node may be determined based on the path information of the newly added node. Therefore, in the implementation in which the identifier of each node is used to represent the path information of the node, the node may be identified using the path information, thereby saving storage space of a global ACL or metadata of the node.

Step S520. The NAS storage system 100 sets an initial permission version number for the newly added node.

When access permission for an upper-level parent node of the newly added node is of a permission root type, the initial permission version number that is set for the newly added node is less than or equal to an initial global version parameter. According to a stipulation of the POSIX standard semantics, when the access permission for the upper-level parent node of the newly added node is of a private type, a permission record of the newly added node inherits a permission record of the upper-level parent node of the newly added node. Therefore, the initial permission version number that is set for the newly added node is a permission version number of the upper-level parent node of the newly added node.

For example, based on the directory tree shown in FIG. 3, when the node 313 is newly added to the directory tree, it is determined based on step S510 that the newly added node 313 is a child node below the intermediate node 311. Therefore, when the initial permission version number is set for the newly added node 313, the access permission for the upper-level parent node of the node 313 needs to be determined. That is, in this implementation, access permission for the intermediate node 311 needs to be determined. The access permission for the intermediate node 311, namely, the access permission for the parent node of the newly added node may be determined according to the method for obtaining the access permission for the to-be-accessed node described in steps S408 to S410 in FIG. 4. For example, based on the global ACL shown in Table 4, if it is determined that the access permission for the intermediate node 311 is a permission record of the intermediate node 311 with the permission root type, the initial permission version number that is set for the newly added node 313 is less than or equal to the value of the initial global version parameter, and may be 0. For example, based on the global ACL shown in Table 5, if it is determined that the access permission for the intermediate node 311 is a permission record of the permission root type, the initial permission version number that is set for the newly added node 313 is the permission version number (0) in the access permission for the intermediate node 311. For example, based on the global ACL shown in Table 7, if it is determined that the access permission for the intermediate node 311 inherits the permission record of the root node 310 with the permission root type, the initial permission version number that is set for the newly added node 313 is less than or equal to the value of the initial global version parameter, and may be 0 or any negative number. For example, based on the global ACL shown in Table 8, if it is determined that the access permission for the intermediate node 311 is a permission record of the intermediate node 311 with the private type, the initial permission version number that is set for the newly added node 313 is the permission version number (2) in the access permission for the intermediate node 311.

Step S530. The NAS storage system 100 stores the permission version number of the newly added node into the global ACL.

The NAS storage system 100 may also store the permission version number of the newly added node into metadata of the newly added node.

In the method for setting permission for a newly added node, when the access permission for the upper-level parent node of the newly added node is of the permission root type, because the permission version number of the newly added node is less than or equal to the initial value of the global version parameter, a permission version number of a parent node set with access permission in all parent nodes that have the permission root type and indicated by the path information of the newly added node is newer than the permission version number of the newly added node. Therefore, the newly added node inherits access permission for a node that has a latest permission version number and that has the permission root type in all the nodes indicated by the path information of the newly added node. Therefore, when access permission is set for the newly added node, an access record of the access permission for the newly added node does not need to be stored, thereby improving efficiency of setting the access permission for the newly added node, and reducing overheads of storing the access permission for the newly added node.

In the method for setting permission for a newly added node, when the access permission for the upper-level parent node of the newly added node is of the private type, to meet the POSIX semantics, the permission record of the newly added node inherits the permission record of the upper-level parent node of the newly added node, and the initial permission version number that is set for the newly added node is the permission version number of the upper-level parent node of the newly added node. Therefore, in the present disclosure, the stipulation of the POSIX standard semantics is supported while efficiency of setting access permission for the newly added node can be improved, and storage overheads of the access permission for the newly added node are reduced.

Based on the embodiment shown in FIG. 5, the node creation request further includes data included in the newly added node. After step S510, the NAS storage system 100 stores the data into the storage array 220.

Figure 6:
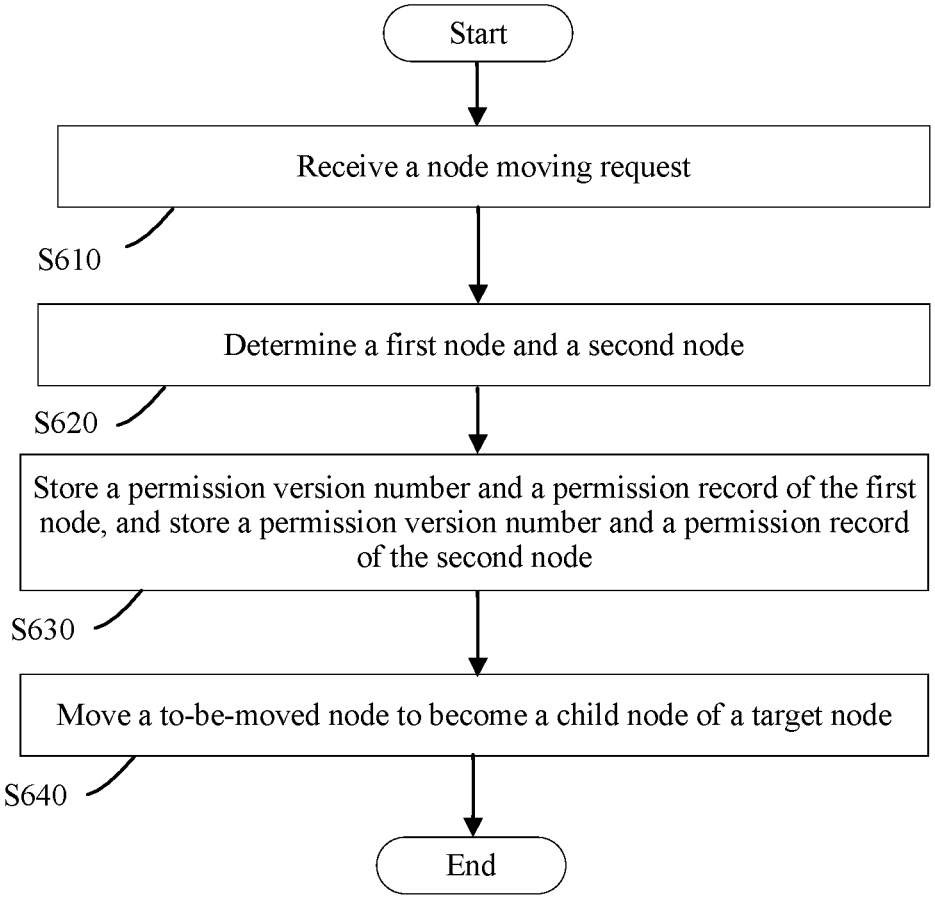
FIG. 6 is a flowchart of a method for setting access permission for a to-be-moved node according to an embodiment of the present disclosure.

Based on the embodiment shown in FIG. 4 or FIG. 5, when the user needs to move any node in a directory tree with a created ACL and move the to-be-moved node to another location in the same directory tree, the present disclosure further provides a method for setting access permission for a to-be-moved node according to a stipulation of the POSIX standard semantics in order to meet the stipulation in the POSIX standard semantics that access permission for the to-be-moved node and all child nodes of the to-be-moved node should not be changed after the to-be-moved node is moved. According to the stipulation of the POSIX standard semantics, the access permission for the to-be-moved node and all the child nodes of the to-be-moved node should not be changed after the to-be-moved node is moved. The following describes in detail the method for setting access permission for a to-be-moved node to ensure that access permission for the to-be-moved node and all child nodes of the to-be-moved node is not changed after the to-be-moved node is moved. FIG. 6 is a flowchart of a method for setting access permission for a to-be-moved node according to an embodiment of the present disclosure. The method for setting access permission for a to-be-moved node provided in this embodiment is performed by the NAS storage system 100 shown in FIG. 2, and may be further performed by the control module 230 in the NAS storage system 100 or the processor 213 in the control module 230 shown in FIG. 2. In the method for setting access permission for a to-be-moved node, before the to-be-moved node is moved, nodes that have latest permission in all nodes indicated by path information of the to-be-moved node before and after the to-be-moved node is moved are separately determined. As shown in FIG. 6, the method for setting access permission for a to-be-moved node includes the following steps.

Step S610. Receive a node moving request.

The node moving request includes an identifier of a to-be-moved node and an identifier of a target node, and the target node is an upper-level parent node of the to-be-moved node after the to-be-moved node is moved.

Step S620. Determine a first node and a second node.

The first node is a node having latest permission in all nodes indicated by path information of the to-be-moved node before the to-be-moved node is moved, and the second node is a node having latest permission in all nodes indicated by path information of the to-be-moved node after the to-be-moved node is moved. In the present disclosure, the first node and the second node are nodes that have a permission root type.

Step S630. Store a permission version number and a permission record of the first node, and store a permission version number and a permission record of the second node. Optionally, the permission version number and the permission record of the first node may not be stored.

Step S640. Move the to-be-moved node to become a child node of the target node.

Based on the method shown in FIG. 6, after the to-be-moved node is moved, when the to-be-moved node or any child node of the to-be-moved node is being accessed, the NAS storage system 100 receives an access request for accessing data, where the access request for accessing data includes an identifier of a to-be-accessed node, and the to-be-accessed node is the to-be-moved node or an any-level child node of the to-be-moved node. After receiving the access request for accessing data, the NAS storage system 100 determines access permission for the to-be-accessed node. Then, the NAS storage system 100 performs authentication based on the access permission for the to-be-accessed node, and accesses data of the to-be-accessed node after the authentication succeeds.

When the to-be-moved node or any child node of the to-be-moved node is being accessed, one case of determining the access permission for the to-be-accessed node is as follows. After the to-be-moved node is moved, if a permission record is set for any one of all nodes indicated by path information of the to-be-accessed node, the access permission for the to-be-accessed node inherits access permission for the to-be-accessed node after moving, and the access permission for the to-be-accessed node after moving inherits access permission for a node having latest permission in the to-be-accessed node and all parent nodes of the permission root type.

When the to-be-moved node or any child node of the to-be-moved node is being accessed, another case of determining the access permission for the to-be-accessed node is as follows. After the to-be-moved node is moved, if no permission record is set for all nodes indicated by path information of the to-be-accessed node, the access permission for the to-be-accessed node is access permission for the to-be-accessed node before moving, and the access permission for the to-be-accessed node before moving inherits access permission for a node having latest permission in the to-be-accessed node and all parent nodes having the permission root type. After the to-be-moved node is moved, no permission record is set for all the nodes indicated by the path information of the to-be-accessed node, and the access permission for the to-be-accessed node is the access permission for the to-be-accessed node before moving, which complies with a stipulation defined in the POSIX semantics that moving a node does not change access permission for the moved node and any child node below the moved node.

Figure 7:
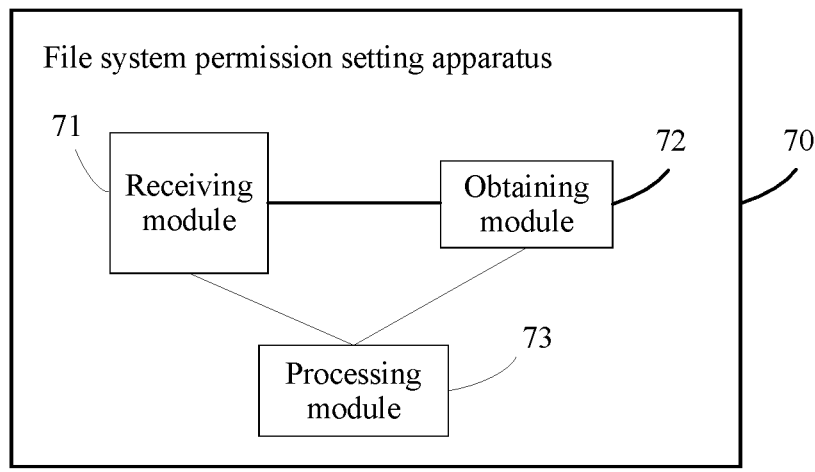
FIG. 7 is a structural diagram of a file system permission setting apparatus according to an embodiment of the present disclosure.

FIG. 7 is a structural diagram of a file system permission setting apparatus 70 according to an embodiment of the present disclosure. The file system permission setting apparatus 70 provided in this embodiment of the present disclosure is applied to a storage system, for example, may be applied to the NAS storage system 100. As shown in FIG. 7, the file system permission setting apparatus 70 provided in this embodiment includes a receiving module 71, an obtaining module 72, and a processing module 73. The receiving module 71 is connected to the obtaining module 72, and the processing module 73 is separately connected to the obtaining module 72 and the receiving module 71.

In the present disclosure, the receiving module 71 is configured to receive a permission setting request, where the permission setting request is used to request to set access permission for a node in a directory tree of a file system, the permission setting request includes an identifier, a semantic type identifier, and a permission record of a node to be set with permission, and the semantic type includes a permission root type and a private type.

In this implementation, a function of receiving, by the receiving module 71, the permission setting request sent by a client may be implemented using the interface 211 in the NAS storage system 100. For specific implementation details of the permission setting request, refer to specific details of step S403 shown in FIG. 4. Details are not described herein again.

In the present disclosure, the obtaining module 72 is configured to obtain a currently recorded global version parameter.

In this implementation, a function of obtaining the currently recorded global version parameter by the obtaining module 72 may be implemented using the interface 212 in the NAS storage system 100, or may be implemented using the processor 213 or the control module 230 in the NAS storage system 100. For specific implementation details of obtaining the currently recorded global version parameter by the obtaining module 72, refer to specific details of step S404 shown in FIG. 4. Details are not described herein again.

In the present disclosure, the processing module 73 is configured to allocate, based on the currently recorded global version parameter, a permission version number to the node to be set with permission, and store the identifier, the semantic type identifier, the permission version number, and the permission record of the node to be set with permission. When the semantic type is the permission root type, the permission version number of the node to be set with permission is a latest global version parameter obtained after the currently recorded global version parameter is updated. When the semantic type is the private type, the permission version number of the node to be set with permission is the currently recorded global version parameter or the latest global version parameter obtained after the currently recorded global version parameter is updated. Global version parameters are set incrementally or decrementally, and each global version number represents one permission setting operation on any node of the directory tree. When the semantic type is the permission root type, a permission record of a child node of the node to be set with permission inherits a permission record obtained after a current permission setting operation on the node to be set with permission.

In this implementation, a function of allocating, by the processing module 73 based on the currently recorded global version parameter, the permission version number to the node to be set with permission may be implemented using the processor 213 or the control module 230 in the NAS storage system 100. For specific implementation details of allocating, by the processing module 73 based on the currently recorded global version parameter, the permission version number to the node to be set with permission, refer to specific details of step S405 shown in FIG. 4. Details are not described herein again.

In this implementation, a function of storing, by the processing module 73, the identifier, the semantic type identifier, the permission version number, and the permission record of the node to be set with permission may be implemented using the processor 213 or the control module 230 in the NAS storage system 100. For specific implementation details of storing, by the processing module 73, the identifier, the semantic type identifier, the permission version number, and the permission record of the node to be set with permission, refer to specific details of step S406 shown in FIG. 4. Details are not described herein again.

According to the apparatus for quickly setting ACL permission for a directory tree, when a semantic type parameter indicates that a semantic type followed by access permission for a parent node is the permission root type, all files and all subdirectories below a directory corresponding to the parent node of the permission root type inherit ACL permission for the parent node. Therefore, only the ACL permission for the parent node needs to be set. It is unnecessary to traverse all the subdirectories or files below the parent node to separately set ACL permission for each subdirectory or file below the parent node, thereby improving efficiency of setting ACL permission for the directory tree. In this case, the ACL permission is set for the parent node, and the ACL permission does not need to be repeatedly set for the subdirectories and the files below the directory corresponding to the parent node, thereby reducing storage space overheads. When the semantic type parameter indicates that the semantic type followed by the access permission for the parent node is the private type, all the files and the subdirectories below the directory corresponding to the parent node do not inherit ACL permission for the parent node obtained after a permission setting operation is currently performed on the parent node. In this case, a manner of setting ACL permission for a node that follows a POSIX standard semantics may be implemented. Therefore, in the apparatus for quickly setting ACL permission for a directory tree provided in the present disclosure, the POSIX standard semantics is followed while efficiency of setting ACL permission for the directory tree is improved, and storage space overheads are reduced.

In an optional implementation, the obtaining module 72 is further configured to query a global ACL to obtain the currently recorded global version parameter. The global ACL is stored in metadata of a root node of the directory tree, and the global ACL stores the global version parameter. In this implementation, a function of querying, by the obtaining module 72, the global ACL to obtain the currently recorded global version parameter may be implemented using the interface 212 in the NAS storage system 100, or may be implemented using the processor 213 or the control module 230 in the NAS storage system 100. For specific implementation details of querying, by the obtaining module 72, the global ACL to obtain the currently recorded global version parameter, refer to specific details of step S404 shown in FIG. 4. Details are not described herein again.

In an optional implementation, the processing module 73 is further configured to create the global ACL, and set an initial global version parameter for the newly created global ACL. In this implementation, a function of creating, by the processing module 73, the global ACL, and setting the initial global version parameter for the newly created global ACL may be implemented using the processor 213 or the control module 230 in the NAS storage system 100. For specific implementation details of creating, by the processing module 73, the global ACL, and setting the initial global version parameter for the newly created global ACL, refer to specific details of steps S401 and S402 shown in FIG. 4. Details are not described herein again.

In an optional implementation, the permission setting request further includes path information of the node to be set with permission, the path information of the node to be set with permission indicates all nodes on an access branch from the root node to the node to be set with permission. The processing module 73 is further configured to store the path information of the node to be set with permission into the global ACL. The identifier, the semantic type identifier, the permission version number, the path information, and the permission record of the node to be set with permission form one correspondence.

In this implementation, a function of storing, by the processing module 73, the path information of the node to be set with permission into the global ACL may be implemented using the processor 213 or the control module 230 in the NAS storage system 100. For specific implementation details of storing, by the processing module 73, the path information of the node to be set with permission into the global ACL, refer to specific details of storing the path information of the node of the directory tree in step S403 shown in FIG. 4. Details are not described herein again.

In an optional implementation, the processing module 73 is further configured to store the identifier, the semantic type identifier, the permission version number, and the permission record of the node to be set with permission into metadata of the node to be set with permission, where the metadata of the node to be set with permission further includes path information of the node to be set with permission, the path information of the node to be set with permission indicates all nodes on an access branch from the root node to the node to be set with permission, and the identifier, the semantic type identifier, the path information, the permission version number, and the permission record of the node to be set with permission form one correspondence.

In this implementation, a function of storing, by the processing module 73, the identifier, the semantic type identifier, the permission version number, and the permission record of the node to be set with permission into the metadata of the node to be set with permission may be implemented using the processor 213 or the control module 230 in the NAS storage system 100. For specific implementation details of storing, by the processing module 73, the identifier, the semantic type identifier, the permission version number, and the permission record of the node to be set with permission into the metadata of the node to be set with permission, refer to specific details about storing the path information of the node in the directory tree in step S403 shown in FIG. 4. Details are not described herein again.

In an optional implementation, the receiving module 71 is further configured to receive a first access request for accessing data, where the first access request for accessing data includes an identifier of a first to-be-accessed n ode.

In this implementation, a function of receiving, by the receiving module 71, the first access request for accessing data may be implemented using the interface 211 in the NAS storage system 100. For specific implementation details of the first access request for accessing data, refer to specific details of step S407 shown in FIG. 4. Details are not described herein again.

The processing module 73 is further configured to obtain access permission for the first to-be-accessed node based on the identifier of the first to-be-accessed node, and perform authentication based on the access permission for the first to-be-accessed node, and access data of the first to-be-accessed node after the authentication succeeds. When a permission version number of the first to-be-accessed node is the latest in permission version numbers of the first to-be-accessed node and all parent nodes of the first to-be-accessed node and that have the permission root type, the access permission for the first to-be-accessed node is a recorded permission record of the first to-be-accessed node. When the permission version number of the first to-be-accessed node is not the latest in the permission version numbers of the first to-be-accessed node and all the parent nodes of the first to-be-accessed node and that have the permission root type, the access permission for the first to-be-accessed node inherits a permission record corresponding to a parent node that is of the first to-be-accessed node and that has a latest permission version number.

In this implementation, a function of obtaining, by the processing module 73, the access permission for the first to-be-accessed node based on the identifier of the first to-be-accessed node, and performing authentication based on the access permission for the first to-be-accessed node, and accessing the data of the first to-be-accessed node after the authentication succeeds may be implemented using the processor 213 or the control module 230 in the NAS storage system 100. For obtaining, by the processing module 73, the access permission for the first to-be-accessed node based on the identifier of the first to-be-accessed node, refer to specific details in steps S408, S409, and S410 shown in FIG. 4. Details are not described herein again. For specific implementation details of performing, by the processing module 73, authentication based on the access permission for the first to-be-accessed node, and accessing the data of the first to-be-accessed node after the authentication succeeds, refer to specific details in step S411 shown in FIG. 4. Details are not described herein again.

Based on the implementation of obtaining, by the processing module 73, the access permission for the first to-be-accessed node based on the identifier of the first to-be-accessed node, and performing authentication based on the access permission for the first to-be-accessed node, and accessing the data of the first to-be-accessed node after the authentication succeeds, an alternative implementation is provided. That is, the obtaining module 72 instead of the processing module 73 may be used to implement the function of obtaining the access permission for the first to-be-accessed node based on the identifier of the first to-be-accessed node. The function of obtaining, by the obtaining module 72, the access permission for the first to-be-accessed node based on the identifier of the first to-be-accessed node may be implemented using the processor 213 or the control module 230 in the NAS storage system 100. For specific implementation details of obtaining, by the obtaining module 72, the access permission for the first to-be-accessed node based on the identifier of the first to-be-accessed node, refer to specific details in steps S408, S409, and S410 shown in FIG. 4. Details are not described herein again.

In an optional implementation, the processing module 73 is further configured to determine path information of the first to-be-accessed node based on the identifier of the first to-be-accessed node, and query permission version numbers of the first to-be-accessed node and all parent nodes of the first to-be-accessed node and that have the permission root type, where the first to-be-accessed node and all the parent nodes are indicated by the path information of the first to-be-accessed node. The processing module 73 is further configured to determine a node with a latest permission version number, and obtain a permission record of the node with the latest permission version number. The path information of the first to-be-accessed node is used to indicate the first to-be-accessed node and all the parent nodes of the first to-be-accessed node, and the permission record of the node with the latest permission version number is the access permission for the first to-be-accessed node.

In this implementation, a function of determining, by the processing module 73, the path information of the first to-be-accessed node based on the identifier of the first to-be-accessed node, and querying the permission version numbers of the first to-be-accessed node and all the parent nodes of the first to-be-accessed node and that have the permission root type to determine the node with the latest permission version number, where the first to-be-accessed node and all the parent nodes are indicated by the path information of the first to-be-accessed node may be implemented using the processor 213 or the control module 230 in the NAS storage system 100. For specific implementation details of determining, by the processing module 73, the path information of the first to-be-accessed node based on the identifier of the first to-be-accessed node, and querying the permission version numbers of the first to-be-accessed node and all the parent nodes of the first to-be-accessed node and that have the permission root type, to determine the node with the latest permission version number, where the first to-be-accessed node and all the parent nodes are indicated by the path information of the first to-be-accessed node, refer to specific details in steps S408 and S409 shown in FIG. 4. Details are not described herein again.

In this implementation, a function of obtaining the permission record of the node with the latest permission version number by the processing module 73 may be implemented using the processor 213 or the control module 230 in the NAS storage system 100. For specific implementation details of obtaining the permission record of the node with the latest permission version number by the processing module 73, refer to specific details in step S410 shown in FIG. 4. Details are not described herein again.

In an optional implementation, the processing module 73 is further configured to compare, according to a preset traversal rule, the permission version numbers of the first to-be-accessed node and all the parent nodes of the first to-be-accessed node and that have the permission root type to determine the node with the latest permission version number, where the first to-be-accessed node and all the parent nodes are indicated by the path information of the first to-be-accessed node.

In this implementation, a function of comparing, by the processing module 73 according to the preset traversal rule, the permission version numbers of the first to-be-accessed node and all the parent nodes of the first to-be-accessed node and that have the permission root type, to determine the node with the latest permission version number, where the first to-be-accessed node and all the parent nodes are indicated by the path information of the first to-be-accessed node may be implemented using the processor 213 or the control module 230 in the NAS storage system 100. For specific implementation details of comparing, by the processing module 73 according to the preset traversal rule, the permission version numbers of the first to-be-accessed node and all the parent nodes of the first to-be-accessed node and that have the permission root type to determine the node with the latest permission version number, where the first to-be-accessed node and all the parent nodes are indicated by path information of the first to-be-accessed node, refer to specific details in step S409 shown in FIG. 4. Details are not described herein again.

In an optional implementation, all nodes indicated by path information of each node in the directory tree separately belong to different directory levels. A directory level of a parent node in all the nodes indicated by the path information of each node in the directory tree is higher than a directory level of a child node that belongs to the parent node. A directory level of the first to-be-accessed node is the lowest, and a directory level of the root node is the highest. The processing module 73 is further configured to select and compare, starting from the root node, permission version numbers of two nodes each time of all the nodes indicated by the path information of the first to-be-accessed node, to determine a node with a newer permission version number, and determine, until the first to-be-accessed node is compared through traversal in descending order of the directory levels, that a node with a newer permission version number is the node with the latest permission version number.

In this implementation, a function of selecting and comparing, by the processing module 73 starting from the root node, permission version numbers of two nodes each time of all the nodes indicated by the path information of the first to-be-accessed node, to determine a node with a newer permission version number, and determining, until the first to-be-accessed node is compared through traversal in descending order of the directory levels, that a node with a newer permission version number is the node with the latest permission version number may be implemented using the processor 213 or the control module 230 in the NAS storage system 100. For specific implementation details of selecting and comparing, by the processing module 73 starting from the root node, permission version numbers of two nodes each time of all the nodes indicated by the path information of the first to-be-accessed node, to determine a node with a newer permission version number, and determining, until the first to-be-accessed node is compared through traversal in descending order of the directory levels, that a node with a newer permission version number is the node with the latest permission version number, refer to specific details in step S409 shown in FIG. 4. Details are not described herein again.

In an optional implementation, all nodes indicated by path information of each node in the directory tree separately belong to different directory levels. A directory level of a parent node in all the nodes indicated by the path information of each node in the directory tree is higher than a directory level of a child node that belongs to the parent node. A directory level of the first to-be-accessed node is the lowest, and a directory level of the root node is the highest. The processing module 73 is further configured to select and compare, starting from the first to-be-accessed node, permission version numbers of two nodes each time of all the nodes indicated by the path information of the first to-be-accessed node, to determine a node with a newer permission version number, and determine, until the root node is compared through traversal in ascending order of the directory levels, that a node with a newer permission version number is the node with the latest permission version number.

In this implementation, a function of selecting and comparing, by the processing module 73 starting from the first to-be-accessed node, permission version numbers of two nodes each time of all the nodes indicated by the path information of the first to-be-accessed node, to determine a node with a newer permission version number, and determining, until the root node is compared through traversal in ascending order of the directory levels, that a node with a newer permission version number is the node with the latest permission version number may be implemented using the processor 213 or the control module 230 in the NAS storage system 100. For specific implementation details of selecting and comparing, by the processing module 73 starting from the first to-be-accessed node, permission version numbers of two nodes each time of all the nodes indicated by the path information of the first to-be-accessed node, to determine a node with a newer permission version number, and determining, until the root node is compared through traversal in ascending order of the directory levels, that a node with a newer permission version number is the node with the latest permission version number, refer to specific details in step S409 shown in FIG. 4. Details are not described herein again.

In an optional implementation, the receiving module 71 is further configured to receive a node moving request, where the node moving request includes an identifier of a to-be-moved node and an identifier of a target node, and the target node is an upper-level parent node of the to-be-moved node after the to-be-moved node is moved.

In this implementation, a function of receiving the node moving request by the receiving module 71 may be implemented using the interface 211 in the NAS storage system 100. For specific implementation details of receiving the node moving request by the receiving module 71, refer to specific details of step S610 shown in FIG. 6. Details are not described herein again.

The processing module 73 is further configured to determine a first node and a second node, store a permission version number and a permission record of the first node, store a permission version number and a permission record of the second node, and move the to-be-moved node to become a child node of the target node. The first node is a node that has latest permission in all nodes indicated by path information of the to-be-moved node before the to-be-moved node is moved. The second node is a node that has latest permission in all parent nodes indicated by path information of the to-be-moved node after the to-be-moved node is moved, and the first node and the second node are nodes that have the permission root type.

In this implementation, a function of determining, by the processing module 73, the first node and the second node, storing the permission version number and the permission record of the first node, storing the permission version number and the permission record of the second node, and moving the to-be-moved node to become the child node of the target node may be implemented using the processor 213 or the control module 230 in the NAS storage system 100. For specific implementation details of determining, by the processing module 73, the first node and the second node, refer to specific details in step S620 shown in FIG. 6. Details are not described herein again.

In an optional implementation, the receiving module 71 is further configured to receive a second access request for accessing data. The second access request for accessing data includes an identifier of a second to-be-accessed node, and the second to-be-accessed node is the to-be-moved node or an any-level child node of the to-be-moved node.

In this implementation, a function of receiving, by the receiving module 71, the second access request for accessing data may be implemented using the interface 211 in the NAS storage system 100. For specific implementation details of receiving, by the receiving module 71, the second access request for accessing data, refer to specific details after step S640 in the implementation shown in FIG. 6. Details are not described herein again.

The processing module 73 is further configured to determine access permission for the second to-be-accessed node, perform authentication based on the access permission for the second to-be-accessed node, and access data of the second to-be-accessed node after the authentication succeeds. After the to-be-moved node is moved, if a permission record is set for any node in all nodes indicated by path information of the second to-be-accessed node, the access permission for the second to-be-accessed node inherits access permission for the second to-be-accessed node after moving. The access permission for the second to-be-accessed node after moving inherits a permission record of a node that has latest permission in the second to-be-accessed node and all parent nodes having the permission root type after moving. After the to-be-moved node is moved, if no permission record is set for any node in all the nodes indicated by the path information of the second to-be-accessed node, the access permission for the second to-be-accessed node inherits access permission for the second to-be-accessed node before moving. The access permission for the second to-be-accessed node before moving inherits a permission record of a node that has latest permission in the second to-be-accessed node and all parent nodes having the permission root type before moving.

In this implementation, a function of determining, by the processing module 73, the access permission for the second to-be-accessed node, performing authentication based on the access permission for the second to-be-accessed node, and accessing the data of the second to-be-accessed node after the authentication succeeds may be implemented using the processor 213 or the control module 230 in the NAS storage system 100. For specific implementation details of determining, by the processing module 73, the access permission for the second to-be-accessed node, performing authentication based on the access permission for the second to-be-accessed node, and accessing the data of the second to-be-accessed node after the authentication succeeds, refer to specific details after step S640 in the implementation shown in FIG. 6. Details are not described herein again.

In an optional implementation, the receiving module 71 is further configured to receive a node creation request. The node creation request includes an identifier and path information of a newly added node of the directory tree, and the path information of the newly added node indicates all nodes on an access branch from the root node to the newly added node.

In this implementation, a function of receiving the node creation request by the receiving module 71 may be implemented using the interface 211 in the NAS storage system 100. For specific implementation details of receiving the node creation request by the receiving module 71, refer to specific details of step S510 shown in FIG. 5. Details are not described herein again.

The processing module 73 is further configured to set an initial permission version number for the newly added node. When access permission for an upper-level parent node of the newly added node is of the permission root type, the initial permission version number that is set for the newly added node is less than or equal to the initial global version parameter, and when the access permission for the upper-level parent node of the newly added node is of the private type, a permission record of the newly added node inherits a permission record of the upper-level parent node of the newly added node, and the initial permission version number that is set for the newly added node is a permission version number of the upper-level parent node of the newly added node.

In this implementation, a function of setting the initial permission version number for the newly added node by the processing module 73 may be implemented using the processor 213 or the control module 230 in the NAS storage system 100. For specific implementation details of setting the initial permission version number for the newly added node by the processing module 73, refer to specific details in step S520 shown in FIG. 5. Details are not described herein again.

According to the file system permission setting method and apparatus provided in the embodiments of the present disclosure, when a semantic type of access permission for a parent node is a permission root type, all child nodes of the parent node inherit ACL permission for the parent node, and therefore, only the ACL permission for the parent node needs to be set. It is unnecessary to traverse all subdirectories or files below the parent node to separately set ACL permission for each subdirectory or file below the parent node, thereby improving efficiency of setting ACL permission for the directory tree. In addition, only the ACL permission for the parent node needs to be set, and the ACL permission does not need to be repeatedly set for a subdirectory and a file below a directory corresponding to the parent node, thereby reducing storage space overheads. When the semantic type parameter indicates that the semantic type followed by the access permission for the parent node is the private type, the access permission for the parent node does not affect ACL permission for all the child nodes after permission setting is currently performed on the parent node. In this case, a manner of setting ACL permission for a node that follows a POSIX standard semantics may be implemented.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the other approaches, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a RAM, a magnetic disk, or an optical disc.

What is claimed is:

1. A file system permission setting method, comprising:
receiving a permission setting request requesting to set an access permission for a node in a directory tree of a file system, wherein the permission setting request comprises an identifier of the node, a semantic type identifier of the node, and a permission record of the node, and wherein the semantic type identifier comprises a permission root type or a private type;
obtaining a currently recorded global version parameter from among a plurality of global version parameters, wherein global version parameters are set incrementally or decrementally, and wherein each of the global version parameters represents one permission setting operation on any node of the directory tree;
allocating, based on the currently recorded global version parameter, a permission version number to the node, wherein the permission version number is a latest global version parameter that is obtained after updating the currently recorded global version parameter when the semantic type identifier is the permission root type and the currently recorded global version parameter or the latest global version parameter when the semantic type identifier is the private type; and
storing the identifier, the semantic type identifier, the permission version number, and the permission record of the node, wherein a permission record of a child node of the node inherits a permission record that is obtained after a current permission setting operation act on the node when the semantic type is the permission root type.

2. The file system permission setting method of claim 1, further comprising querying a global access control list (ACL) to obtain the currently recorded global version parameter, wherein the global ACL is stored in metadata of a root node of the directory tree, and wherein the global ACL stores the currently recorded global version parameter.

3. The file system permission setting method of claim 2, wherein before receiving the permission setting request, the file system permission setting method further comprises:
creating the global ACL; and
setting an initial global version parameter for the global ACL.

4. The file system permission setting method of claim 3, wherein the permission setting request further comprises path information of the node, wherein the path information indicates all nodes on an access branch from the root node to the node, wherein the file system permission setting method further comprises storing the path information into the global ACL, and wherein the identifier, the semantic type identifier, the permission version number, the path information, and the permission record of the node form one correspondence.

5. The file system permission setting method of claim 1, further comprising storing the identifier, the semantic type identifier, the permission version number, and the permission record of the node into metadata of the node, wherein the metadata further comprises path information of the node, wherein the path information indicates all nodes on an access branch from a root node to the node, and wherein the identifier, the semantic type identifier, the path information, the permission version number, and the permission record of the node form one correspondence.

6. The file system permission setting method of claim 1, further comprising:
receiving a first access request for accessing data, wherein the first access request comprises an identifier of a first to-be-accessed node;
obtaining a first access permission for the first to-be-accessed node based on the identifier of the first to-be-accessed node, wherein the first access permission is a recorded permission record of the first to-be-accessed node when a first permission version number of the first to-be-accessed node is a latest in permission version numbers of the first to-be-accessed node and all parent nodes of the first to-be-accessed node having the permission root type, and wherein the first access permission inherits a permission record corresponding to a parent node of the first to-be-accessed node having a latest permission version number when the first permission version number is not the latest in the permission version numbers of the first to-be-accessed node and all the parent nodes of the first to-be-accessed node having the permission root type;
performing authentication based on the first access permission; and
accessing data of the first to-be-accessed node after the authentication succeeds.

7. The file system permission setting method of claim 6, further comprising:
determining, based on the identifier of the first to-be-accessed node, path information of the first to-be-accessed node indicating the first to-be-accessed node and all parent nodes of the first to-be-accessed node;
querying the permission version numbers of the first to-be-accessed node and all the parent nodes of the first to-be-accessed node having the permission root type to determine a node with a latest permission version number; and
obtaining a permission record of the node with the latest permission version number, wherein the permission record of the node with the latest permission version number is the first access permission.

8. The file system permission setting method of claim 7, further comprising comparing, according to a preset traversal rule, the permission version numbers of the first to-be-accessed node and all the parent nodes of the first to-be-accessed node having the permission root type to determine the node with the latest permission version number.

9. The file system permission setting method of claim 1, further comprising:
receiving a node moving request comprising an identifier of a to-be-moved node and an identifier of a target node, wherein the target node is an upper-level parent node of the to-be-moved node after the to-be-moved node is moved;
determining a second node, wherein the second node has a latest permission in all parent nodes indicated by path information of the to-be-moved node after the to-be-moved node is moved, and wherein the second node has the permission root type;
storing a permission version number and a permission record of the second node; and
moving the to-be-moved node as a child node of the target node.

10. The file system permission setting method of claim 9, wherein after moving the to-be-moved node, the file system permission setting method further comprises:
receiving a second access request for accessing data, wherein the second access request comprises an identifier of a second to-be-accessed node, and wherein the second to-be-accessed node is the to-be-moved node or an any-level child node of the to-be-moved node; and
determining whether a permission version of the second node is a latest in permission versions of all nodes indicated by information about a path from the second to-be-accessed node to a root node after moving, wherein an access permission for the second to-be-accessed node inherits a permission record of a node having a latest permission in all nodes indicated by a path from the second to-be-accessed node to the root node before moving when the permission version of the second node is the latest in the permission versions of all the nodes indicated by the information about the path from the second to-be-accessed node to the root node after moving.

11. A file system permission setting apparatus, comprising:
an interface configured to receive a permission setting request requesting to set an access permission for a node in a directory tree of a file system, wherein the permission setting request comprises an identifier of the node, a semantic type identifier of the node, and a permission record of the node, and wherein the semantic type identifier comprises a permission root type or a private type; and
a processor coupled to the interface and configured to:
obtain a currently recorded global version parameter from among a plurality of global version parameters, wherein global version parameters are set incrementally or decrementally, wherein each of the global version parameters represents one permission setting operation on any node of the directory tree;

allocate, based on the currently recorded global version parameter, a permission version number to the node, wherein the permission version number is:
- a latest global version parameter that is obtained after updating the currently recorded global version parameter when the semantic type identifier is the permission root type; and
- the currently recorded global version parameter or the latest global version parameter when the semantic type identifier is the private type; and store the identifier, the semantic type identifier, the permission version number, and the permission record of the node, wherein a permission record of a child node of the node inherits a permission record that is obtained after a current permission setting operation act on the node when the semantic type identifier is the permission root type.

12. The file system permission setting apparatus of claim 11, wherein the processor is further configured to query a global access control list (ACL) to obtain the currently recorded global version parameter, wherein the global ACL is stored in metadata of a root node of the directory tree, and wherein the global ACL stores the currently recorded global version parameter.

13. The file system permission setting apparatus of claim 12, wherein the processor is further configured to:
create the global ACL; and
set an initial global version parameter for the global ACL.

14. The file system permission setting apparatus of claim 13, wherein the permission setting request further comprises path information of the node, wherein the path information of the node indicates all nodes on an access branch from the root node to the node, wherein the processor is further configured to store the path information of the node into the global ACL, and wherein the identifier, the semantic type identifier, the permission version number, the path information, and the permission record of the node form one correspondence.

15. The file system permission setting apparatus of claim 11, wherein the processor is further configured to store the identifier, the semantic type identifier, the permission version number, and the permission record of the node into metadata of the node, wherein the metadata of the node further comprises path information of the node, wherein the path information of the node indicates all nodes on an access branch from a root node to the node, and wherein the identifier, the semantic type identifier, the path information, the permission version number, and the permission record of the node form one correspondence.

16. The file system permission setting apparatus of claim 11, wherein the interface is further configured to receive a first access request for accessing data, wherein the first access request comprises an identifier of a first to-be-accessed node, and wherein the processor is further configured to:
obtain a first access permission for the first to-be-accessed node based on the identifier of the first to-be-accessed node, wherein the first access permission is a recorded permission record of the first to-be-accessed node when a first permission version number of the first to-be-accessed node is a latest in permission version numbers of the first to-be-accessed node and all parent nodes of the first to-be-accessed node having the permission root type, and wherein the first access permission inherits a permission record corresponding to a parent node of the first to-be-accessed node having a latest permission version number when the first permission version number is not the latest in the permission version numbers of the first to-be-accessed node and all the parent nodes of the first to-be-accessed node having the permission root type;
perform authentication based on the first access permission; and
access data of the first to-be-accessed node after the authentication succeeds.

17. The file system permission setting apparatus of claim 16, wherein the processor is further configured to:
determine path information of the first to-be-accessed node based on the identifier of the first to-be-accessed node, wherein the path information of the first to-be-accessed node indicates the first to-be-accessed node and all the parent nodes of the first to-be-accessed node;
query the permission version numbers of the first to-be-accessed node and all parent nodes of the first to-be-accessed node having the permission root type to determine a node with a latest permission version number; and
obtain a permission record of the node with the latest permission version number, wherein the permission record of the node with the latest permission version number is the first access permission.

18. The file system permission setting apparatus of claim 17, wherein the processor is further configured to compare, according to a preset traversal rule, the permission version numbers of the first to-be-accessed node and all the parent nodes of the first to-be-accessed node having the permission root type to determine the node with the latest permission version number.

19. The file system permission setting apparatus of claim 11, wherein the interface is further configured to receive a node moving request, wherein the node moving request comprises an identifier of a to-be-moved node and an identifier of a target node, wherein the target node is an upper-level parent node of the to-be-moved node after the to-be-moved node is moved, and wherein the processor is further configured to:
determine a second node, wherein the second node has a latest permission in all parent nodes indicated by path information of the to-be-moved node after the to-be-moved node is moved, and wherein the second node further has the permission root type;
store a permission version number and a permission record of the second node; and
move the to-be-moved node as a child node of the target node.

20. The file system permission setting apparatus of claim 19, wherein the interface is further configured to receive a second access request for accessing data, wherein the second access request comprises an identifier of a second to-be-accessed node, wherein the second to-be-accessed node is the to-be-moved node or an any-level child node of the to-be-moved node, wherein the processor is further configured to determine whether a permission version of the second node is a latest in permission versions of all nodes indicated by information about a path from the second to-be-accessed node to a root node after moving, wherein an access permission for the second to-be-accessed node inherits a permission record of a node having a latest permission in all nodes indicated by a path from the second to-be-accessed node to the root node before moving when the permission version of the second node is the latest in the permission versions of all the nodes indicated by the information about the path from the second to-be-accessed node to the root node after moving.

\* \* \* \* \*